(12) United States Patent
Anderson et al.

(10) Patent No.: US 9,152,306 B2
(45) Date of Patent: Oct. 6, 2015

(54) TECHNIQUES FOR TOUCH AND NON-TOUCH USER INTERACTION INPUT

(71) Applicant: Intel Corporation, Santa Clara, CA (US)

(72) Inventors: Glen J. Anderson, Beaverton, OR (US); Albert Yosher, Raanana (IL); Anthony L. Chun, Los Altos, CA (US)

(73) Assignee: INTEL CORPORATION, Santa Clara, CA (US)

( * ) Notice: Subject to any disclaimer, the term of this patent is extended or adjusted under 35 U.S.C. 154(b) by 104 days.

(21) Appl. No.: 13/948,683

(22) Filed: Jul. 23, 2013

(65) Prior Publication Data
US 2014/0071069 A1    Mar. 13, 2014

Related U.S. Application Data

(63) Continuation-in-part of application No. 13/335,866, filed on Dec. 22, 2011, now Pat. No. 8,736,583, and a continuation-in-part of application No. 13/074,639, filed on Mar. 29, 2011, now Pat. No. 8,717,318.

(51) Int. Cl.
*G06F 3/0484*    (2013.01)
*G06F 3/041*     (2006.01)
*A63F 13/20*     (2014.01)
(Continued)

(52) U.S. Cl.
CPC ............... *G06F 3/0484* (2013.01); *A63F 13/06* (2013.01); *G06F 3/013* (2013.01); *G06F 3/017* (2013.01); *G06F 3/0304* (2013.01); *G06F 3/041* (2013.01); *G06F 3/04883* (2013.01); *A63F 2300/1068* (2013.01); *A63F 2300/1081* (2013.01); *A63F 2300/1093* (2013.01); *A63F 2300/6045* (2013.01)

(58) Field of Classification Search
CPC ............. G06F 2203/04101; G06F 2203/04104; G06F 2203/04106; G06F 2203/0488; G06F 3/013; G06F 3/017; G06F 3/0304; G06F 3/041; G06F 3/043; G06F 3/0433; G06F 3/0484; G06F 3/04883; A63F 13/06; A63F 2300/1068; A63F 2300/1081; A63F 2300/1093; A63F 2300/6045
USPC ............ 345/156, 173, 175; 178/18.03–18.07, 178/18.09; 715/863, 864
See application file for complete search history.

(56) References Cited

U.S. PATENT DOCUMENTS 8,077,157 B2 * 12/2011 Sengupta et al. ............. 345/173
8,194,043 B2 *  6/2012 Cheon et al. ................. 345/173
(Continued)

OTHER PUBLICATIONS

International Search Report and Written Opinion received for PCT Patent Application No. PCT/US2014/047814, mailed Nov. 7, 2014, 12 pages.

*Primary Examiner* — Tom Sheng
(74) *Attorney, Agent, or Firm* — Kacvinsky Daisak Bluni PLLC

(57) ABSTRACT

Various embodiments are generally directed a method and apparatus having a touch screen module to receive first input data from a touch screen sensor based on one or more detected touch inputs at a first location of a virtual object displayed on a display. In addition, an ultrasonic module may receive second input data from an ultrasonic sensor based on detected non-touch motion associated with the virtual object. The detected non-touch motion may be tracked from the first location to a second location in a direction away from the first location based on the second input data and used to determine the second location for the virtual object based on the tracking.

24 Claims, 25 Drawing Sheets

(51) Int. Cl.
*G06F 3/01* (2006.01)
*G06F 3/03* (2006.01)
*G06F 3/0488* (2013.01)

(56) References Cited

U.S. PATENT DOCUMENTS

| | | | |
|---|---|---|---|
| 8,410,922 B2 | 4/2013 | Null et al. | |
| 8,842,495 B2 | 9/2014 | Hersey | |
| 8,854,433 B1 * | 10/2014 | Rafii | 348/47 |
| 2002/0071345 A1 | 6/2002 | Chiang et al. | |
| 2007/0126696 A1 * | 6/2007 | Boillot | 345/156 |
| 2011/0148798 A1 * | 6/2011 | Dahl | 345/173 |
| 2011/0169832 A1 | 7/2011 | Brown et al. | |
| 2012/0249429 A1 * | 10/2012 | Anderson et al. | 345/173 |
| 2012/0249443 A1 * | 10/2012 | Anderson et al. | 345/173 |
| 2012/0274610 A1 * | 11/2012 | Dahl | 345/177 |
| 2013/0050080 A1 * | 2/2013 | Dahl et al. | 345/158 |
| 2013/0057502 A1 * | 3/2013 | Aklil | 345/174 |
| 2013/0127783 A1 * | 5/2013 | Lee | 345/175 |
| 2014/0267084 A1 * | 9/2014 | Krulce et al. | 345/173 |
| 2014/0267142 A1 * | 9/2014 | MacDougall et al. | 345/174 |

* cited by examiner

500

RECEIVING INPUT DATA FROM AN IMAGE DETECTOR, THE INPUT DATA INCLUDING DATA OBTAINED FROM TRACKING AIR MOVEMENTS OF A USER'S BODY PART INTERACTING WITH A VIRTUAL OBJECT OF AN ELECTRONIC DISPLAY
510

MAPPING THE INPUT DATA TO CONTROL DATA TO MOVE THE VIRTUAL OBJECT BEYOND THE DISPLAY
520

*FIG. 5A*

TECHNIQUES FOR TOUCH AND NON-TOUCH USER INTERACTION INPUT

CROSS-REFERENCE TO RELATED APPLICATIONS

This application is a continuation-in-part of, and claims priority to, prior U.S. patent application Ser. No. 13/335,866, filed on Dec. 22, 2011, entitled Virtual Links Between Different Displays to Present a Single Virtual Object, and prior U.S. patent application Ser. No. 13/074,639, filed Mar. 29, 2011, entitled Continued Virtual Links Between Gestures and User Interface Elements, both of which are incorporated by reference in their entirety.

TECHNICAL FIELD

Embodiments described herein generally relate to detecting touch and non-touch user inputs on computing devices. In particular, embodiments relate to detecting and processing touch and non-touch inputs to control a virtual object displayed on one or more computing device displays.

BACKGROUND

Typical computing input modalities include the use of air-gestures which involves a user moving her body and having such movement interpreted as a user command or cause a corresponding action to happen on a display. Current air gesture technology uses either sensors (such as in the Wii® remote controller by the Nintendo Company®) or 3D camera technology (such as in the Microsoft Kinect® by the Microsoft Corporation®) to approximate body motion as a modal input source. Television displays are typical feedback mechanisms for viewing the effects of air-gesture modal input in a graphical environment. Integrated cameras are also known that are designed to gather video input for gesture detection. Software may perform detection and rudimentary interpretation of gesture input. Touch and sweep gestures on a display screen to move objects from one screen (e.g. a handheld console screen) to another screen (e.g. a TV screen) in the context of electronic games have also been made possible.

BRIEF DESCRIPTION OF THE DRAWINGS

Embodiments of the invention are illustrated by way of example, and not by way of limitation, in the figures of the accompanying drawings in which like reference numerals refer to similar elements.

FIGS. 5A and 5B illustrate a flow diagram of a method embodiment.

DETAILED DESCRIPTION

Figure 1A:
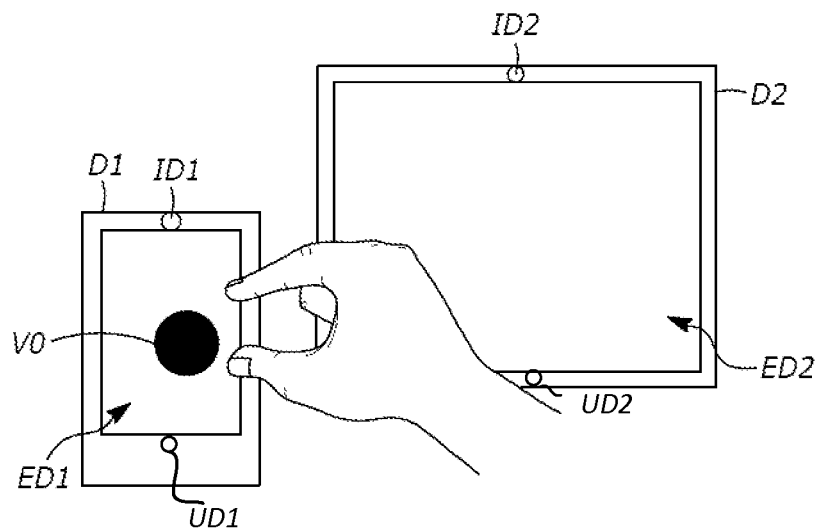
FIGS. 1A-1H illustrates a process to move a virtual object across screens according to a first embodiment.

Visual feedback makes user interaction more engaging. For example, games and other usages may involve virtually picking up objects from the X-Y plane of the screen and gesturing to drop or throw objects back at the screen. User experience may be enhanced by implementing an augmented reality reflection of what the user is virtually holding, such as after virtually picking it up off a touch screen. Further visual feedback and interactions with user gestures may provide an even more engaging experience.

Sensor technology with the ability to detect human motion in three dimensions continues to shrink in size and price. As a result, smaller form factor devices such as smartphones, tablet computers, and laptops are increasingly becoming a platform for technologies involving the use of cameras and ultrasonic sensors to detect user gestures as modal inputs to devices using mobile platforms. Since mobile displays that respond to touch are becoming ubiquitous on mobile devices, embodiments propose pairing air-gesture input closely with touch-gesture input for electronic devices in order to allow a more versatile manipulation of objects. According to one embodiment, for example, air movements of a user body part are tracked using a movement detector, such as an image detector and/or an ultrasonic detector, and input data from such tracking is mapped to control input to move a virtual object beyond an electronic display and device. Examples of a display may include any output device capable of presenting a visual user interface view, whether on a screen of a device, or whether projected from a device to form a visual image exterior to the device. An example of such a latter scenario may include a projected display on wall.

Embodiments provide several novel interaction approaches and gestures that may be accomplished using various input devices, such as touch screens, 3D cameras and ultrasonic sensors. Embodiments also propose cross-device gestures to move objects in novel ways across multiple displays and devices, such as across displays implemented on separate devices, for example.

According to some embodiments, a device includes a processor to receive input data from an image detector and/or an ultrasonic detector, where the input data includes data obtained from tracking air movements of a user body part interacting with a virtual object of the electronic display. The processor may map the input data to a control input to move the virtual object beyond the display and device. The device could, for example, include a mobile device such as a smartphone, a tablet computer, a laptop, or other mobile device. The processor maps the input data to a control input to move the virtual object beyond the visual portions (e.g., screen) of an electronic display. For instance, the processor could map the input data to the control input to either move the virtual object from a first display of a first device to a second display of a second device, move the virtual object to a virtual space (e.g. a bezel) of the first device, and so forth.

According to one embodiment, input data is fed to the processor from an image detector or ultrasonic detector and a touch screen sensor coupled to a screen of the display in order to allow a mapping of the input data to control data to move the virtual object beyond the display and device. For example, the touch screen sensor may allow the virtual object to be pinched from the display, before being removed or lifted beyond the display and device. A pinch gesture may thus allow one to control an object, while a removal gesture may allow one to virtually remove that object from a display. Optionally, the processor may map the input data to control input to create a virtual binding of the virtual object in order to create a visual rendering of a connection between the virtual object and the user body part. The virtual binding may comprise a visual rendering, such as a three-dimensional (3D) rendering, of a connection between a user body part and the virtual object that is being controlled by the user body part. A virtual binding may for example be depicted as a 3D virtual tether between the fingers and the virtual object being manipulated. The virtual binding could thus be a dynamic screen image that graphically depicts how a virtual object that is virtually controlled by a user body part behaves in response to the user moving that body part. The appearance of the binding may be determined by an angle and position of the body part holding the virtual object.

According to another embodiment, the processor may map the input data to control input to place the virtual object onto a second display of a second electronic device. The air movements may include a releasing motion of the user body part with respect to a target location of the virtual object on this second display. The processor may further map the input data to control input to determine an inertial behavior of the virtual object once on the second display. In the instant description, reference to a "user body part" is meant to refer to any part of the human anatomy, such as a hand, finger, palm knuckles, feet, legs, eyes, head, etc. In addition, reference to a "user hand" is meant to encompass some or all of a human hand, including any part of the hand, such as fingers, palm, knuckles, etc.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Embodiments will be described with respect to the examples of FIGS. 1A-1H, FIGS. 2A-2D and FIGS. 3A-3C, each of those in conjunction with FIGS. 4A and 4B.

Referring to of FIGS. 1A-1H, FIGS. 2A-2D and FIGS. 3A-3C common elements as between those figures will now be described. In each of those figures, the virtual object (VO) is depicted as a ball for ease of depiction, although it is understood that the VO may have any suitable shape. The VO may for example include an icon, a picture, a graphical representation or an animated graphical illustration. The VO may for example include a graphical representation of an object sensed by standard camera input, or characteristics, such as color, that the user may select. The VO may further include a game piece with attributes that cause it to act in a certain way, such as a bomb versus an arrow in a game setting. In addition, the VO may include a single VO, or a plurality of VOs.

In some embodiments, the VO may be a graphical representation associated with a file, a photo, a video file, a music file, an email, a message, an application, application data (e.g., contact data), and other information. As will be further discussed below, the VO may be used to transfer or send one or more of the associated file, photo, video file, music file, email or contact data from a first device to a second device. Various embodiments are not limited in this manner; the VO may be associated with any file or data which may be transferred from one device to another device.

Figure 2A:
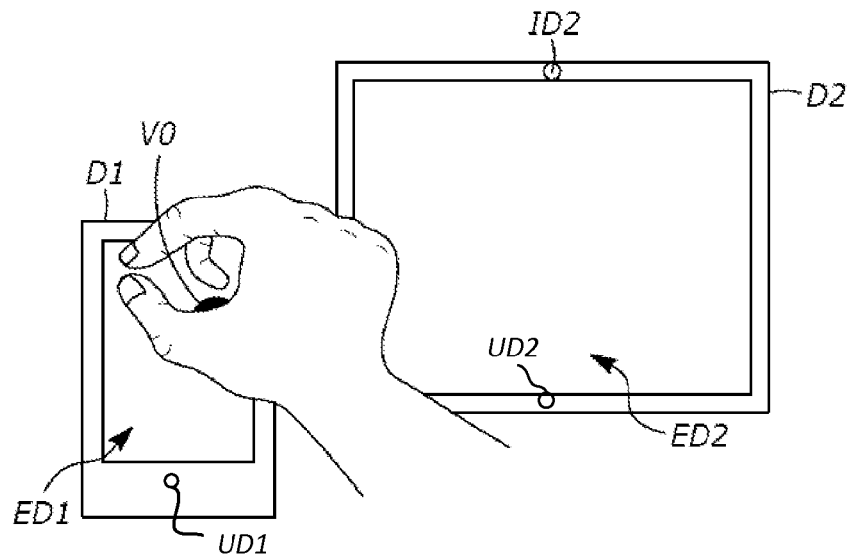
FIG. 2A-2D illustrates a process to move a virtual object across screens according to a second embodiment.
Figure 2B:
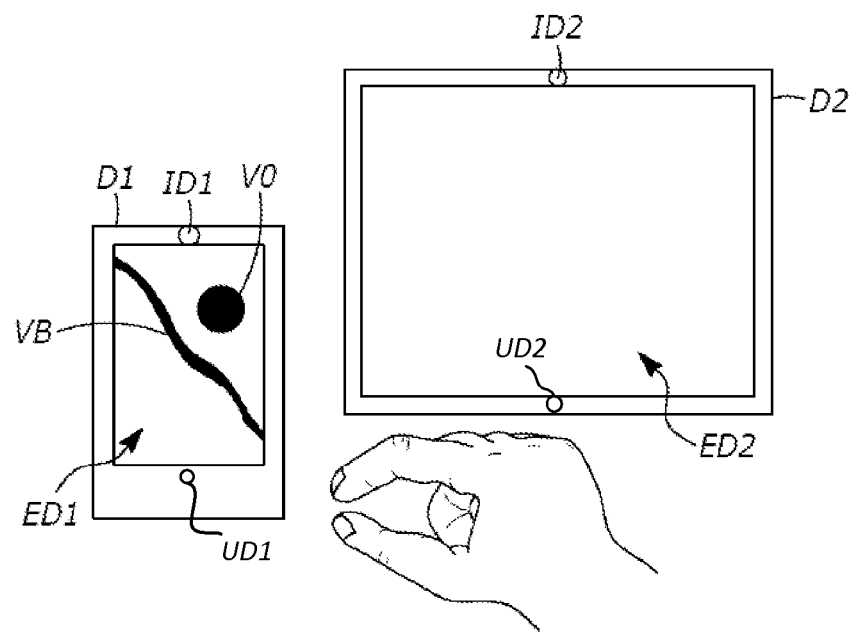
Figure 2C:
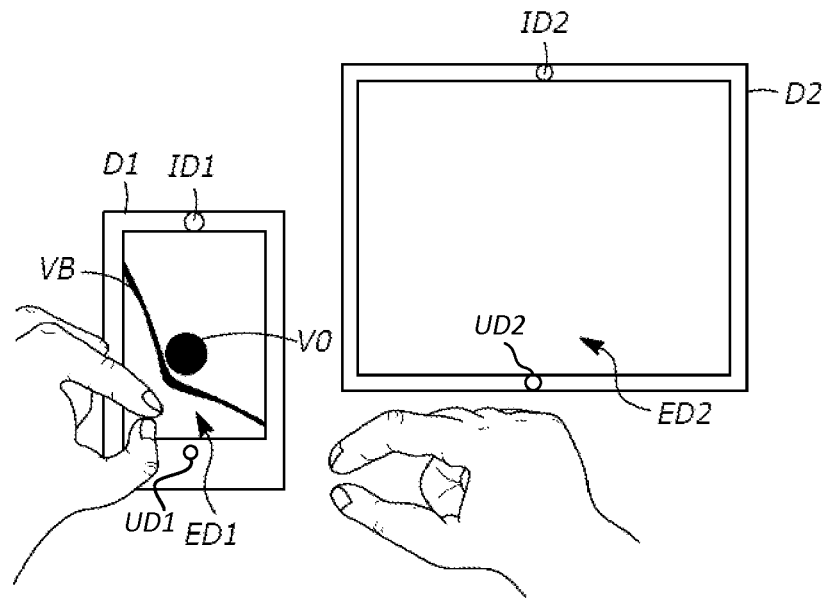
Figure 2D:
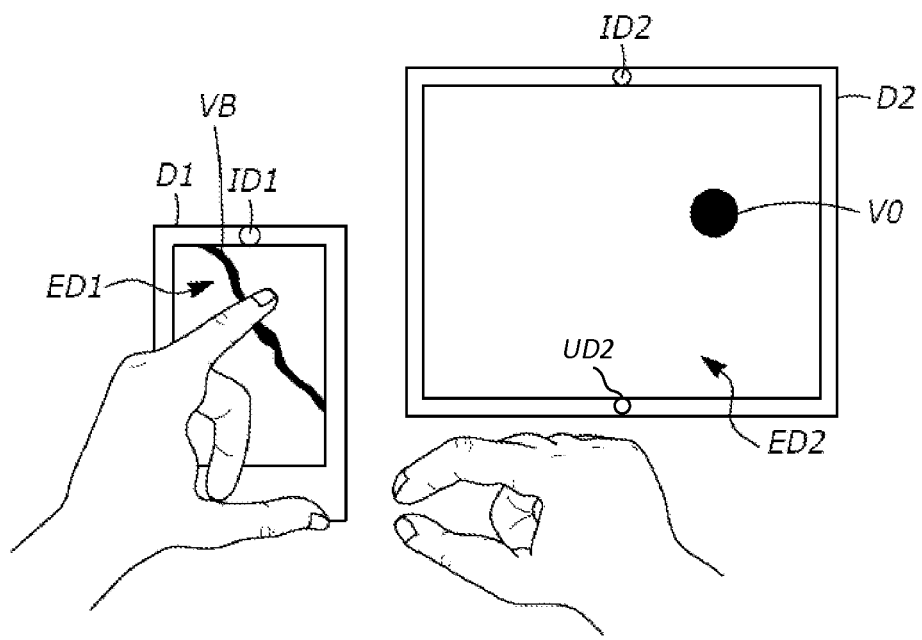
Figure 3A:
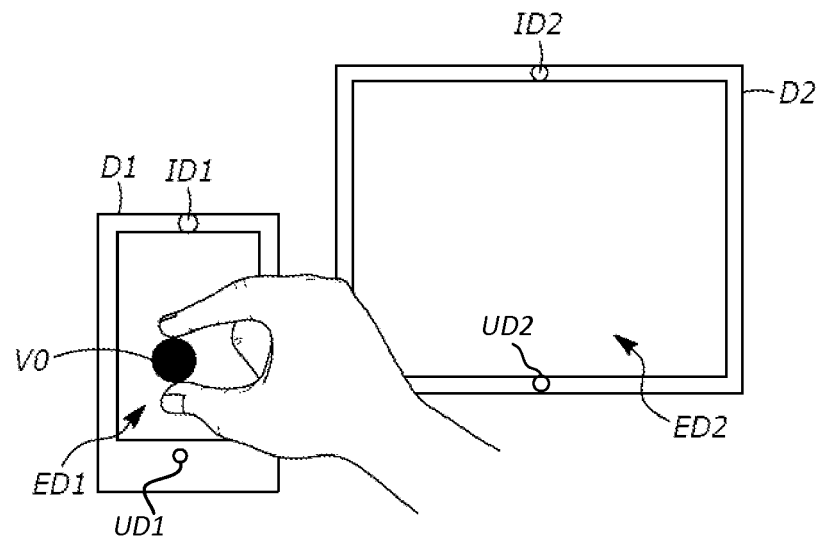
FIG. 3A-3C illustrates a process to move a virtual object to a bezel area of a display screen.
Figure 3B:
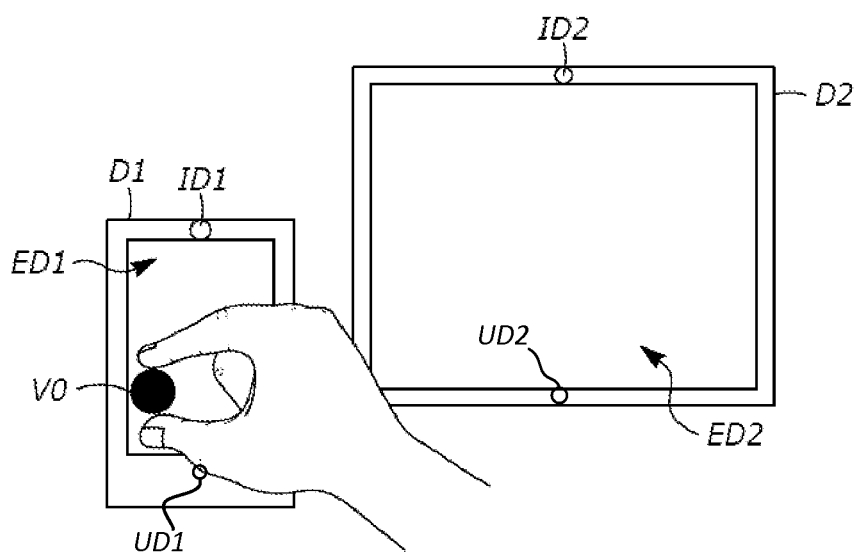
Figure 3C:
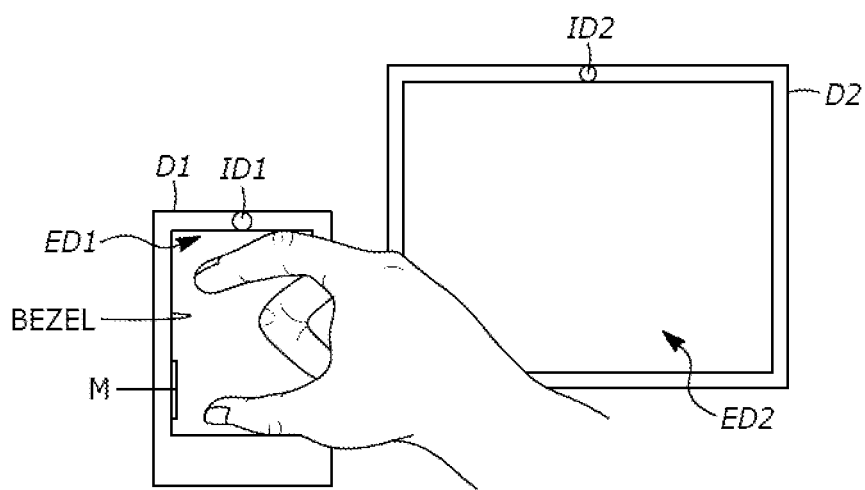

Also shown in the noted figures are two devices D1 and D2 (although D2 may be optional in the embodiments of FIGS. 3A-3C). In the shown embodiments, D1 is depicted as a smartphone device including a display ED1, and D2 is depicted as a personal computer including a display ED2. As seen in FIGS. 1A-1H, FIGS. 2A-2D and FIGS. 3A-3C, each of D1 and D2 are equipped with an image detector ID1 and ID2, respectively. In addition to or in place of, each of D1 and D2 may also be equipped with an ultrasonic detector UD1 and UD2, respectively The various components shown in FIGS. 1A-1H, FIGS. 2A-2D and FIGS. 3A-3C are explained in further detail with respect to FIGS. 4A and 4B below.

Figure 4A:
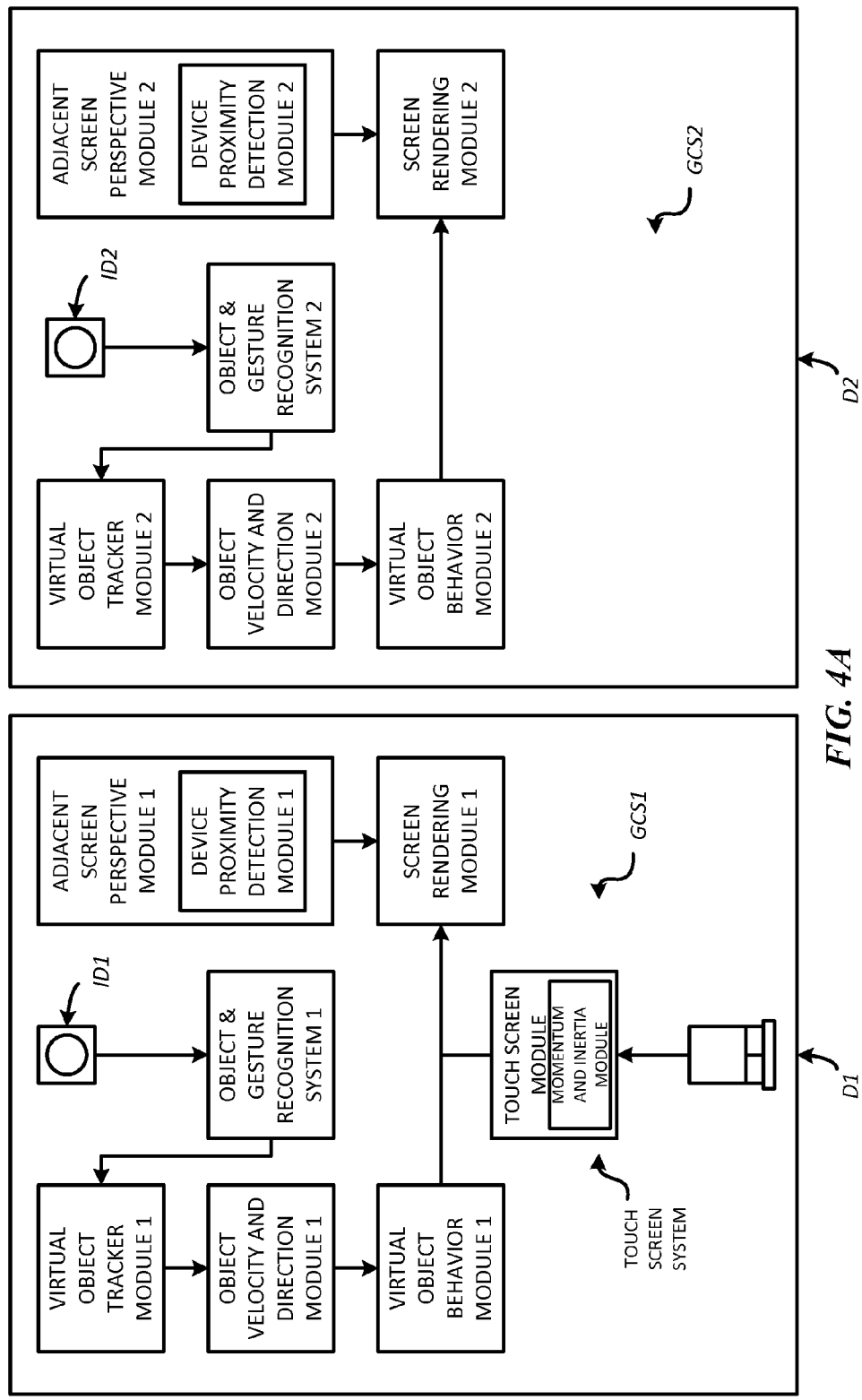
FIGS. 4A and 4B illustrate embodiments of the first display and the second display shown in FIGS. 1a-1h or 2a-2d, including functional modules.
Figure 4B:
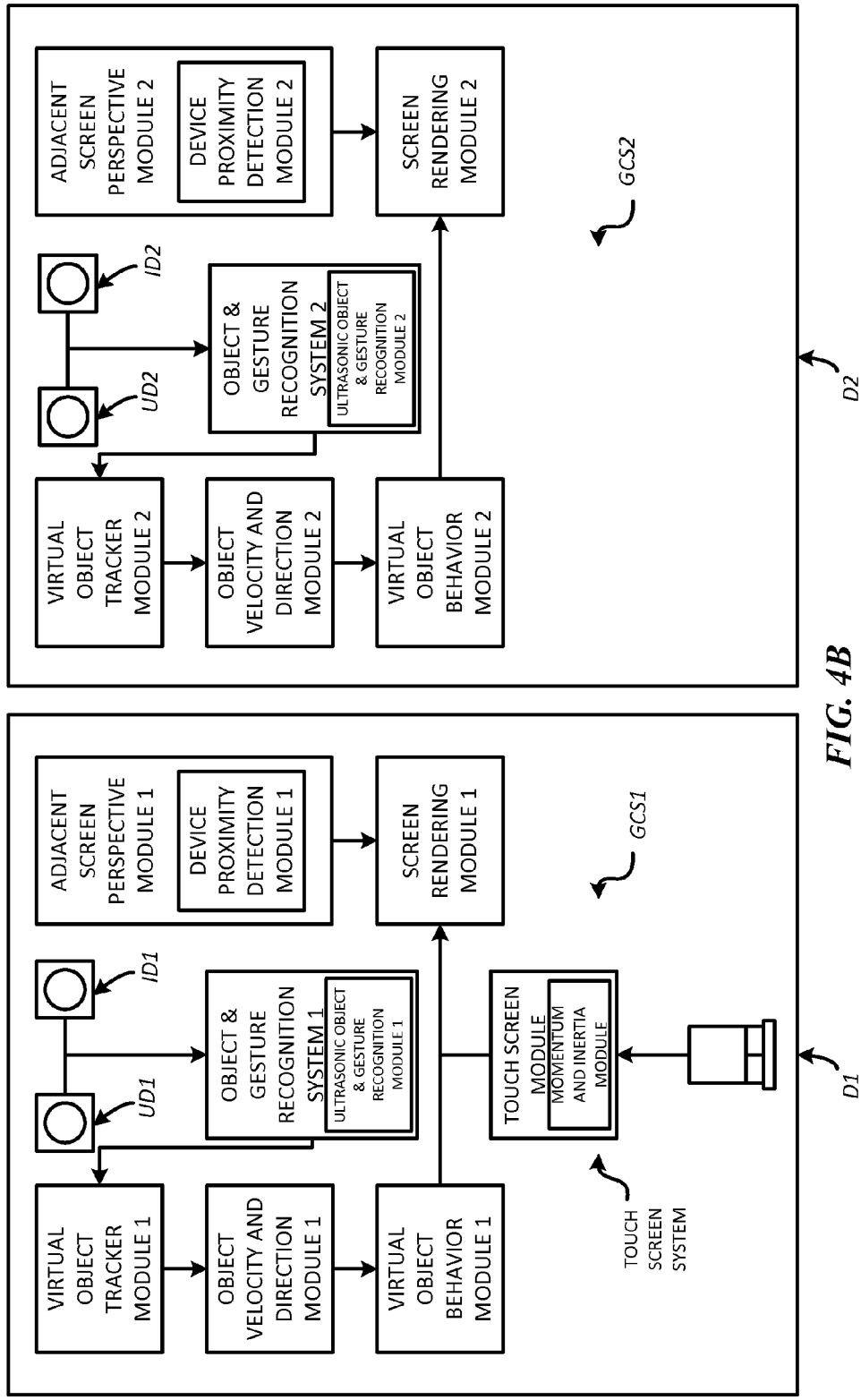

Referring now to FIGS. 4A and 4B in conjunction with FIGS. 1A-1H, FIGS. 2A-2D and FIGS. 3A-3C, each of D1 and D2 may incorporate a gesture capturing system (GCS1 and GCS2) as shown. Each GCS may include one or more processors in order to affect the functions to be described below. D1 and D2 may be implemented with same or similar parts, each having a same label and designated using a label "1" or "2". As used herein, the label "1/2" may refer to part 1, part 2, part 1 and part 2, or part 1 or part 2. It may be appreciated that in some embodiments the described structure, operations and examples associated with a given part 1 may be equally applicable to a given part 2 of the same name. Embodiments are not limited in this context.

In each of D1 and D2 as shown, there exists an image detector ID1/ID2, an ultrasonic detector UD1/UD2 and a bundle of input data processing modules, which include an Object and Gesture Recognition Module 1/2, a Virtual Object Tracker Module 1/2, an Object Velocity and Direction Module 1/2, and a Virtual Object Behavior Module 1/2. Each bundle of modules in the shown embodiments also includes an Adjacent Screen Perspective Module 1/2 and a Screen Rendering Module 1/2. The Adjacent Screen Perspective Module 1/2 may include a Device Proximity Detection Module 1/2. In some embodiments, the Object and Gesture Recognition Module 1/2 may include an Ultrasonic Object and Gesture Recognition Module 1/2. The contribution of each of the modules within the bundle of modules in each GCS1/2 will be explained below. The Object and Gesture Recognition Module 1/2, Ultrasonic Object and Gesture Recognition Module 1/2, the Virtual Object Tracker Module 1/2, the Object Velocity and Direction Module 1/2, the Virtual Object Behavior Module 1/2, the Adjacent Screen Perspective Module 1/2 and a Screen Rendering Module 1/2, the Adjacent Screen Perspective Module 1/2 and the Device Proximity Detection Module 1/2 may be representative of hardware, software, firmware or a combination thereof.

Referring first to the image detector ID 1/2, the ID may include, for example, one or more 3-Dimensional (3D) depth sensing cameras, or an optical detection array infused behind a visible display and outer bezel. For example, the bezel of one of the devices may contain IR emitters and an IR receiver to allow position tracking of user gestures. The ID may for example be adapted to capture air movements of a user body part in the form of images, and to feed such input data to the Object and Gesture Recognition Module 1/2.

Moreover, the computing devices D1/D2 may also include an ultrasonic detector UD 1/2. The ultrasonic detector UD 1/2 may include one or more ultrasonic sensors, emitters and receivers to enable ultrasonic or ultrasound motion detection. In various embodiments, the UD may use non-continuous or continuous wave ultrasonic signals that are emitted from the device and received by one or more detectors, sensors or microphones. Wave ultrasound may be emitted by a transmitter or speaker, reflected from an object (e.g., a user hand), and received by one or more receivers, sensors or microphones. For example, an ultrasonic emitter or speaker may transmit appropriately encoded wave ultrasonic signals. The ultrasound may propagate through the air and reflect off of a user hand if the hand is positioned within a reflection detection zone. The reflected ultrasound may be received by one, two, three, or more ultrasound detectors or microphones positioned about the computing device. In some embodiments, the reflection detection zone may include detection within a few centimeters of the display to a few feet. For example, in some embodiments, the detector may detect motion within 10 centimeters of the detector and display and up to 20 feet from the display. However, various embodiments are not limited by these examples and the detection zone is based on the capabilities of the ultrasonic detector.

In various embodiments, the ultrasonic detector UD may be located on or within the bezel of the housing of the device. Further, the ultrasonic detector UD may be located on or within any of the sides (left, right, top, or bottom), the front or the back of the housing. For example, the bottom front bezel of one of the devices may contain a speaker and a microphone receiver to allow position tracking of user gestures. The UD may, for example, be adapted to capture air movements of a user body part by measuring the reflection of an ultrasound off of a user hand by the microphone, and to feed such input data to the Object and Gesture Recognition Module 1/2.

In some embodiments, the ultrasonic detector UD 1/2 may work with the image detector ID 1/2 to assist in motion detections that may not be detected by the image detector ID. For example, some cameras may be limited to how closely they may detect motion from the display. This limitation may be based on the quality of the camera or the angle of placement of the camera within or on the housing. Thus, a "dead zone" may be created in which the camera cannot detect motion. The ultrasonic detection may supplement the image detector and provide a higher granularity of detection within the "dead zone." As previously discussed, the ultrasonic detector UD may detect motion within centimeters of the display.

Moreover, the computing device may switch between the ultrasonic detector UD and the image detector ID based on a threshold distance of the detected object, hand, finger, etc., from the display, detector, housing, etc. The threshold distance may be based on the capabilities of the ultrasonic detector UD and image detector ID. For example, the ultrasonic detector UD may be better suited to detect objects at 10 centimeters or less from the display and the image detector ID may be better suited to detect objects at a distance greater than 10 centimeters. Thus, when an object moves beyond this threshold distance, the computing device will switch from the ultrasonic detector to the image detector to detect motion and gestures. Various embodiments are not limited to this example, and the threshold distance may be determined by a user or based on any capability of the detecting devices. Furthermore, the computing device can switch from the image detector ID to the ultrasonic detector UD when an object moves closer to the display or detectors.

Various embodiments are not limited to using the image detector ID and/or ultrasonic detector UD to detect motion gestures. For example, in some embodiments, a radio frequency detector (RFD) may be used to detect motion and gestures. A Radio Frequency detector could be used to detect motion and gestures by measuring the amplitude and phase of transmitted RF signals sent from an transmitting device such as a an access point, a cellular base station or a transmitter located within or on the housing of the device. The transmitted signal is received by a receiving device, such as an radio frequency receiver and the behavior of the signal measurements would be calibrated as a function of position of the transmitter and receiver, size and speed of the gestures etc., so that subsequent measurements could be translated into recognizing objects and gestures.

The Object and Gesture Recognition Module may be adapted to recognize and track hand and arm gestures of a user. Such a module may be used to recognize hands, fingers, finger gestures, hand movements and a location of hands relative to displays by utilizing information received from the image detector ID and/or the ultrasonic detector UD. For example, the Object and Gesture Recognition Module could determine that a user made a body part gesture to pick up, drop or throw the VO onto ED1 or ED2, or that the user made a body part gesture to move the VO to a bezel of D1 or D2.

In various embodiments, the Object and Gesture Recognition Module may include an Ultrasonic Object and Gesture Recognition Module 1/2 to process information received from the ultrasonic detector UD. For example, the Ultrasonic Object and Gesture Recognition Module 1/2 may receive information from the UD indicating that a user made a gesture with a hand or finger to move or release the VO. The Ultrasonic Object and Gesture Recognition Module may receive ultrasound signals and modulate the signals to correlate with the emitted signal. The channel impulse response may be determined based on the difference between the transmission and reception or time of flight. The impulse response may be determined multiple times over a period of time to determine changes in the impulse response. These changes may be used to determine if a gesture or pattern has been made by the user by comparing the impulse responses over time with a library or stored data of gestures created during a training session. For example, buffered impulse response images may be filtered using special filtering to extract features that can be matched to pre-trained template library of user input gestures. Moreover, echo response patterns may also be used to determine particular gestures in the 3D space. In order to analyze and match the received reflections, embodiments may comprise various signal processing elements. These signal processing elements may filter out patterns and features from the received channel response and correlate these features to a gesture.

The Virtual Object Tracker Module may be adapted to track where a VO should be located in three dimensional space in a vicinity of an electronic display, such as ED1 or ED2 for example, and which body part of the user is holding the VO, based on input from the Object and Gesture Recognition Module. The Virtual Object Tracker Module 1 and Virtual Object Tracker Module 2 may for example both track a VO as it moves from ED1 toward ED2, and they may track which body part of the user is holding that VO. Tracking the body part that is holding the VO allows a continuous awareness by one or more GCS' of the body part's air movements, and thus an eventual awareness by one or more GCS' as to whether the VO has been released onto either ED1 or ED2 as will be further explained below. In addition, where a user body part may interact with a display to create a virtual binding, the Virtual Object Tracker Module may be adapted to track such bindings as the body parts move in the air, which tracking may be correlated with input from the Adjacent Screen Perspective Module to be described in the paragraph below. In addition, when the Virtual Object Tracker Module determines that the user body part holding a VO is positioned beyond an ED, such as ED1, and either that no additional ED's are in the VO's trajectory, for example, the Virtual Object Tracker Module may send an input directly to the Screen Rendering Module to show a map view that includes a representation of the surrounding area. The map view is a virtual representation of objects saved within a device that may not normally be shown on the display, such as objects saved within the bezel area, and can be virtually pulled out of the bezel area (for example by virtually pulling out a marker next to the bezel area) to be observed. The map thus provides visual feedback when manipulating a VO along a plane and assists the user in selecting a destination target during manipulation beyond the physical ED or between multiple ED's when traveling in virtual space.

The Adjacent Screen Perspective Module, which may include the Device Proximity Detection Module, may be adapted to determine an angle of the screen of one display relative to a screen of another display, such as a relative angle of the screen of ED1 to the screen of ED2, for example if the Adjacent Screen Perspective Module is Adjacent Screen Perspective Module 1, and vice versa if the Adjacent Screen Perspective Module is Adjacent Screen Perspective Module 2. For example in the embodiment of FIGS. 1A-1H and 2A-2D, where D1 is a smartphone and D2 is a personal computer, Adjacent Screen Perspective Module 2 in D2 may be adapted to detect the presence of D1, and to use an analysis of images of the VO originating from ED1 to determine an angle of D1's screen relative to D2's screen. Such detection of screens and angles of displayed areas through software may detect the shape of light emitted from a projected display. A projected display includes, for example, an image projected onto a wall or screen. The ability to detect proximity of a nearby screen and a corresponding angle or orientation of a display projected therefrom may for example be accomplished with an infrared emitter and a receiver, or electromagnetic or photo detection sensing capability. For technologies that allow projected displays with touch input, software currently exists that analyzes incoming video to determine the position of a projected display and to correct for the distortion caused by displaying at an angle.

In the case of embodiments, use of an accelerometer could for example allow determining the angle at which a device, such as D1, is being held while infrared or ultrasound could allow determination of orientation of the device D1 in relation to the sensors on the adjacent device D2. According to embodiments, using such software, the Adjacent Screen Perspective Module, D2 may determine coordinates of D1's screen relative to its own screen coordinates. Thus, the Adjacent Screen Perspective Module may determine which devices are in proximity to each other, and further potential targets for moving one or more VO's across screens. The Adjacent Screen Perspective Module may further propose target landing or release zones for the VO on the target screen, for example in the form of a shadow on ED2 if the VO is being moved from ED1 to ED2.

The Object and Velocity and Direction Module may be adapted to estimate the dynamics of a VO being moved, such as its trajectory, velocity (whether linear or angular), momentum (whether linear or angular), etc. by receiving input from the Virtual Object Tracker Module. The Object and Velocity and Direction Module may further be adapted to estimate dynamics of a virtual binding if one is used, by for example estimating the degree of stretching of the virtual binding, and its dynamic behavior once released by a user body part. In the latter case, the Object and Velocity and Direction Module may build on existing software and hardware that tracks user interaction with 3D images that appear to be coming out of a screen. For example, gesture detection in conjunction with a bi-directional (BiDi) screen has already been proposed in prototype technology developed at the Massachusetts Institute of Technology. The Object and Velocity and Direction Module may also build on existing modules that use image motion, size and angle changes to estimate the velocity of objects, such as the velocity of hands and fingers, which modules are currently used in games, such as, for example, in games utilizing the Softkinetic Iisu™ SDK by the Softkinetic Corporation. According to one embodiment, for example, such software may be used to compensate for and/or determine the shape of a VO or of a virtual binding to be defined below, correcting for a geometry of a virtual image according to an angle and direction of a source display with respect to a target display and device.

The Virtual Object Behavior Module is adapted to receive input from the Object and Velocity and Direction Module, and to apply such input to a VO being shown in the display. Thus, for example, the Object and Gesture Recognition System would interpret the input from the image detector ID and/or ultrasonic detector UD by mapping the captured movements of a user hand to recognized movements, the Virtual Object Tracker Module would associate the VO's position and movements to the movements as recognized by Object and Gesture Recognition System, the Object and Velocity and Direction Module would capture the dynamics of the VO's movements, and the Virtual Object Behavior Module would receive the input from the Object and Velocity and Direction Module to generate data that would direct the movements of the VO to correspond to the input from the Object and Velocity and Direction Module.

The Screen Rendering Module is adapted to receive the data from the Virtual Object Behavior Module, and to render the VO and/or virtual bindings on a screen such as ED1 or ED2 in a manner consistent with such received data. Thus, the data from the Virtual Object Behavior Module would determine the position and dynamics of the VO and or associated virtual binding, for example, and the Screen Rendering Module would depict the VO and/or associated virtual binding on an ED accordingly. The Screen Rendering Module could further be adapted to receive data from the Adjacent Screen Perspective Module to either depict a target landing area for the VO if the VO could be moved to the display of the device with which the Adjacent Screen Perspective Module is associated. Thus, for example, if the VO is being moved from ED1 to ED2, Adjacent Screen Perspective Module 2 could send data to Screen Rendering Module 2 to suggest, for example in shadow form, one or more target landing areas for the VO on ED2 that track to a user hand movements.

As further shown in the embodiments of FIGS. 4A and 4B, the GCS1 of D1 may also include a Touch Screen System 1, such as a conventional Touch Screen System, which may include a touch screen sensor TSS. Data from the TSS may be fed to a Touch Screen Module which may comprise hardware, software, firmware or a combination of the same. The Touch Screen Module may take the data from the TSS, for example to map the touch gesture of a user hand on the screen to a corresponding dynamic behavior of a VO. The Touch Screen Module may for example include a Momentum and Inertia Module that allows a variety of moment behavior for a VO based on input from a user hand. The Touch Screen Module according to an embodiment may for example be adapted to interpret certain hand interactions of a user with respect to a screen, such as, for example, a pinching gesture, which may be interpreted by the Touch Screen Module to indicate the user's wish to lift the VO from the display screen, and/or to begin generating a virtual binding associated with the VO, as will be explained with respect to FIGS. 1A-1H and 2A-2D further below. For example, to differentiate between a zoom command, which in a current Touch Screen System typically involves moving the thumb and forefinger of a hand close together while those fingers are touching a screen in question, and a pinch and lift command to pinch and lift a VO from a screen, the Touch Screen Module could for example be adapted to interpret a gesture as a pinch and lift command where the thumb and forefinger of a user hand are brought more closely together than a zoom gesture.

Although the shown embodiments of FIGS. 4A and 4B depict each device as incorporating an image detector and ultrasonic detector, and various software modules for mapping input data from the image detectors and ultrasonic detector to control input, embodiments are not so limited. Thus, for example, D1 and D2 could be adapted to process input data from a shared image detector or ultrasonic detector (not shown), or from a shared image processing system (not shown) including an image detector and ultrasonic detector coupled to an Object and Gesture Recognition Module, a Virtual Object Tracker Module, an Object Velocity and Direction Module and a Virtual Object Behavior Module, for example, this processing system being shared as between D1 and D2 to move the VO from ED1 to ED2 (FIGS. 1*a*-1*h* and 2*a*-2*d*). In addition, although FIGS. 4A and 4B depicts D1 as including a Touch Screen System, embodiments encompass within their scope the incorporation of a Touch Screen System in both D1 and D2, or in none of D1 and D2.

Figure 6:
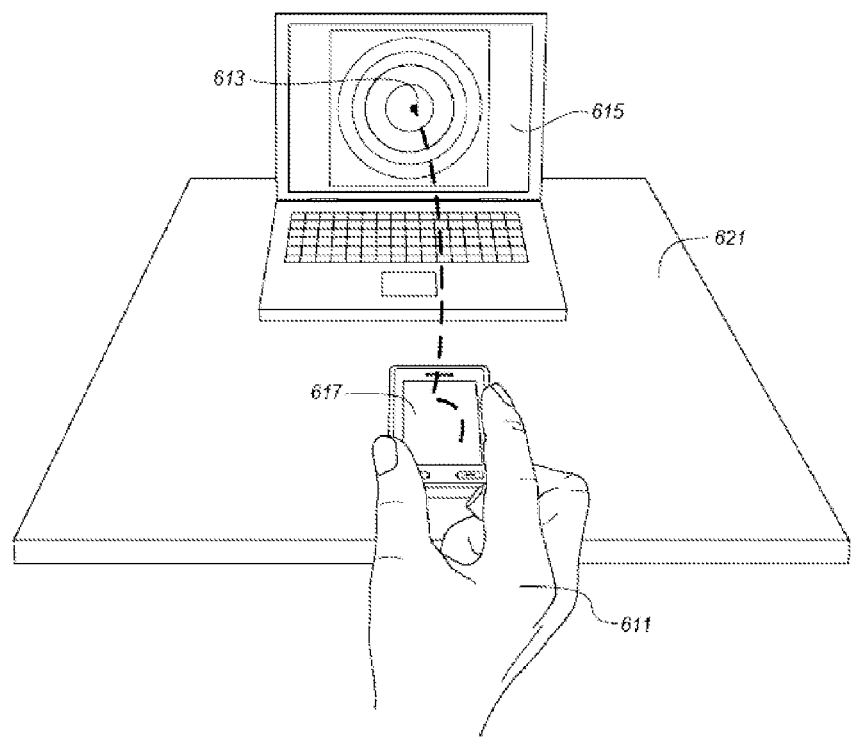
FIG. 6 illustrates a process to bounce a virtual object from one screen to another according to an embodiment.

Referring first to the example of FIGS. 1A-1H and to FIGS. 4A and 4B, an embodiment is depicted where: (1) a virtual object (VO) may be acquired from the screen of first electronic display ED1 belonging to first electronic device D1, virtually picked up by a user hand, moved over to a location closer to the screen of second electronic display ED2 belonging to second electronic device D2, and then virtually released onto the latter screen; and (2) VO may be acquired from the screen of ED2 and virtually moved back to the ED1. The examples described above may be enhanced with additional user interaction. In one example of the invention, a user virtually bounces a virtual object from one display to another. In FIG. 6 a user 611, holding a virtual object 613, shown as a simple dot, has thrown the virtual object toward a large display 615 of a computer, or other device. As shown by the dotted line trajectory of the virtual object, the virtual object has first bounced off of a smaller first display 617. The smaller display may be a media player, smart phone, slate computer, notebook computer, or a display of a desktop or all-in-one machine. Dedicated gaming devices may be used as well. The virtual object strikes the first display and may interact with displayed objects on the main display. It may also bounce back to the first display. The apparatus described above allows for gestures, object positions, and physics of the virtual objects interactions to be generated and tracked.

The second display 615 and the first display 617 are shown as resting on a table 621. This arrangement is portable and easy to set up. The particular support is not important to the invention. The principles discussed herein may be applied to devices on the floor or a park bench or to an entertainment or theater room in which the second display is for a television or projector and the first display is a full desktop computer. Many desktop and notebook computers accept touch input and are available with or may be equipped with a camera and microphones for air gestures and voice commands. The first display may also be handheld to allow interaction with a larger display without any table at all.

To implement the interactions of FIG. 6, the Virtual Object Tracker Module of FIG. 4 tracks the virtual object from the user hand, to the smaller first display, and then to one or more other displays. The Adjacent Screen Perspective Module determines the virtual path of the virtual object. This allows the game to provide virtual bouncing across screens. Users may throw or otherwise launch objects to bounce off many different surfaces. The Virtual Object Tracker Module determines that the virtual path of the object should be in a trajectory from the first display to the second or vice versa.

Figure 7:
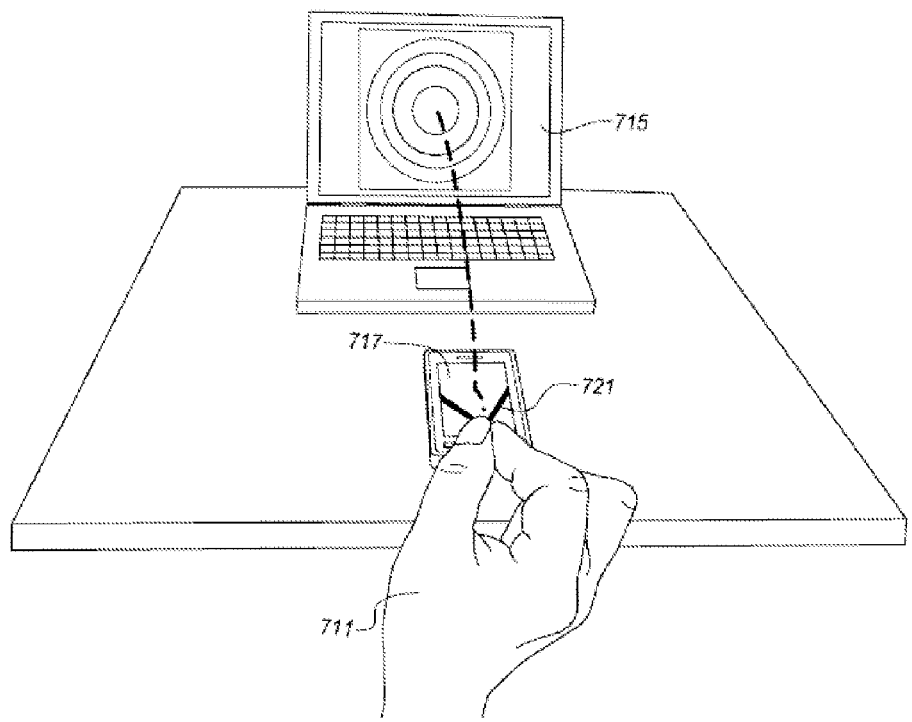
FIG. 7 illustrates a process to bounce a virtual object using virtual bindings from one screen to another according to an embodiment.

In another example, the virtual object may be a projectile launched with virtual bindings from one screen to another. In FIG. 7, a user 711 orients a handheld device 717 toward a larger display 715. The user then draws back the virtual object against virtual bindings 721. The virtual object is released to virtually bounce off the first display and be launched toward the large display 715. In this example, the first display is resting on a table, but as with FIG. 6, the first display may be handheld and the system of two displays may be configured in many different ways.

The two displays may share a single computing resource or may both have independent computing resources and communicate with each other using local area networking or dedicated communications protocols. In one example, a second computing system supporting the first display, such as a smart phone processor, tracks the progress of the operations of selecting a virtual object and inputting user gestures to launch the object toward the second display. At that point the second computing system then passes parameters to a first computing system supporting the second display. The second display then represents the virtual object and its interaction with real and virtual objects on and near the second display. The parameters may be passed via a direct wireless connection, over a network, or in a variety of other ways. In a game environment, control over the game can pass between the devices or one device can control the game while the other device serves only as a user input device, such as a game controller. The parameters sent from the first display may be values for basic variables, such as the position and trajectory of the virtual object, to insert into the game software driving the first display.

Figure 8:
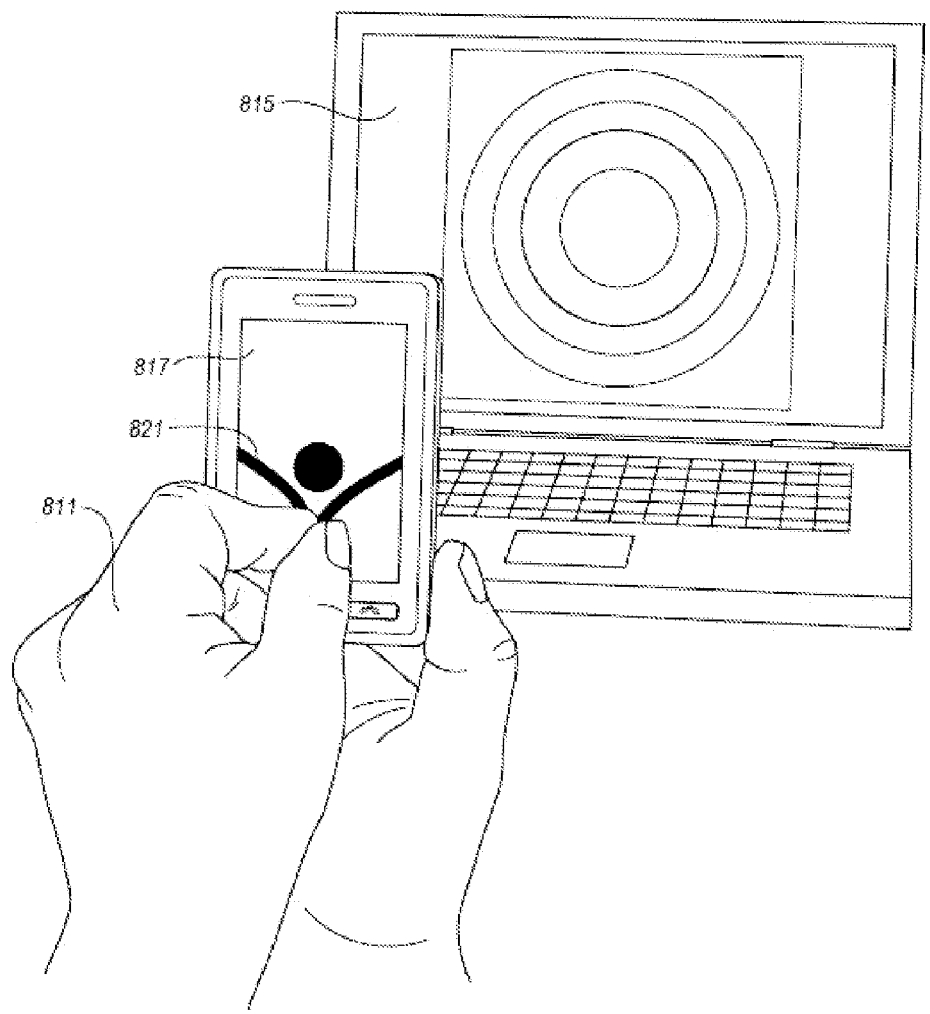
FIG. 8 illustrates a process to sling a virtual object using virtual bindings from one screen to another according to an embodiment.

In another example shown in FIG. 8, the first display 817 shows a virtual bindings user interface in this case in the form of a slingshot. Here the user 811 pulls back the virtual bindings 821 and orients the first display with respect to a second display 815. Upon releasing the virtual bindings, a virtual object concealed by the user hands is launched toward the second display. The trajectory of the virtual object is determined based on the user touch gesture on the virtual bindings and the relative positions of the two displays. The Adjacent Screen Perspective Module of FIGS. 4A and 4B determines the relative positions of the two screens and provides this information to the Object Velocity and Direction Module so that the trajectory can be tracked by the Virtual Object Tracker Module.

As compared to the example of FIG. 7 in which the virtual object is launched with the bounce on the first display that is then impacted by the virtual bindings, in the example of FIG. 7, the virtual object is actually shown on the display and launched from that view. In all three examples as shown in FIGS. 6, 7, and 8, the position of the first display may be used as a factor in determining the trajectory of the virtual object. In all three examples, the first display may show a reflection of the user to enhance the sense of interactivity of the user interface.

In all three examples, the user may select virtual objects to be launched with the touch screen. The virtual objects in these examples behave as projectiles and different objects may exhibit different physics effects depending on the type. A projectile may be propelled, it may have drag, it may change course due to other virtual forces, such as wind, gravity, virtual bats or virtual guns, etc. The selection of the virtual object may be performed by selecting from a predetermined and pre-programmed list of choices or a virtual object may be configured by the user.

In one example, the user scans a real object and then uses that object in the virtual world. The object may be any scanned object, animal, or person and may be actual or taken from a picture or drawing. The user may scan things nearby, pictures nearby, or access previously taken pictures. The user may then be allowed to configure the new virtual object with physical and physics properties, such as size, mass, drag, etc.

In some embodiments, the selection of the virtual object may automatically invoke a particular type of virtual binding. The virtual binding may be activated automatically or by the user depending on the implementation. The selected projectile is then launched using the virtual binding. Virtual binding may be used to represent a slingshot, a catapult, a throwing or pitching arm, or a variety of other launching devices, both real and imagined.

As in the examples of FIGS. 1, 2, and 3, and in the virtual binding scenarios, the user may use voice commands to change the nature of the object to be launched (color, category, capabilities) or change the nature of how it is launched or change the view that appears on the displays before and after launching the object. Alternatively, secondary gestures or eye tracking may be used to influence the targeting and the physics of the virtual object. All of these inputs may be accepted and processed before, during, or after launch of the virtual object. These effects may all be received by the Object and Gesture Recognition System and even by cameras and microphones for eye tracking, voice tracking and direction of attention.

Figure 9:
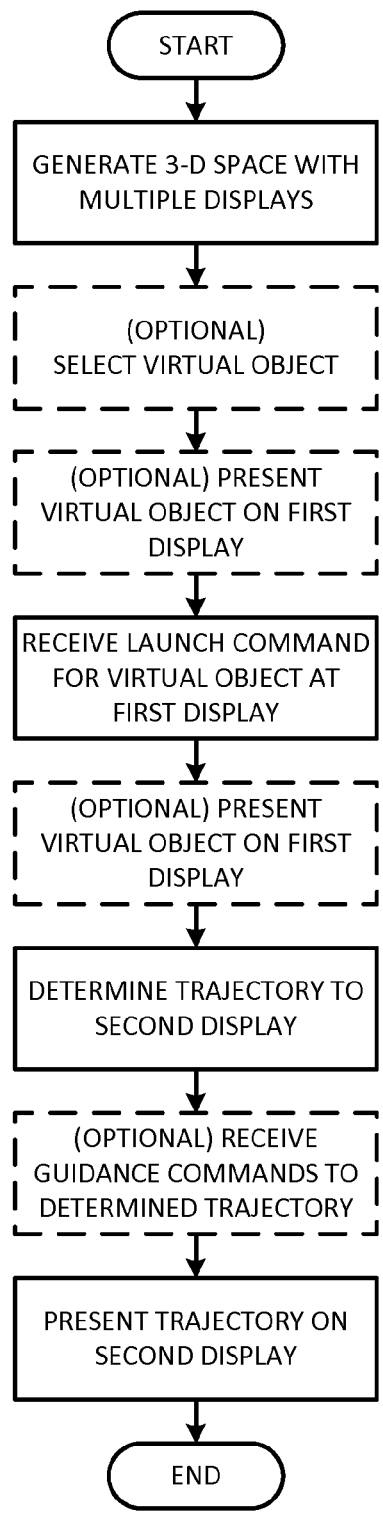
FIG. 9 illustrates a flow diagram of another method embodiment.

The examples of FIGS. 6, 7, and 8, are shown as a simplified process flow in FIG. 9. At 901, the process starts and a three-dimensional space is generated. This space includes the two displays and any other real or virtual objects. The three-dimensional relationship between the two displays is determined and included in the space. The determination may be made using resources associate with either or both displays or with other processing resources.

At 903, a virtual object is selected for use in the virtual 3-D space. The virtual object may be selected based on a list of virtual objects presented on the first or second display. The user then makes a selection using a command to select a virtual object before launching the object. Virtual objects may also be selected by presenting a selection of virtual objects on the display based on observing objects in the real space. These objects may be nearby objects or previously observed objects. The system may generate a representation of at least one observed real object and then, based on that representation, generate a virtual object. The generated virtual objects may then be presented as a selection of virtual objects on the first display. The operation at 903 is optional and may be replaced by default or predetermined selections.

At 905 the virtual object may optionally be presented on the display. This may be a representation of the virtual object or a shadow of a virtual object with a virtual location off the screen as described above. At 907, a launch command is received to launch the virtual object from or off the first display. The command may come in many forms, including touch screen gestures, such as a touch screen motion performed on the first display to launch the virtual object from the first display, or an air gesture. The gesture may be a throwing motion to throw the virtual object at the first display. The throwing motion may be performed on the touch screen or within view of a camera or ultrasonic sensor associated with the first display. Since the object is virtual, there will be a spatial relationship between the virtual position of the virtual object and the position of the gesture. This can be used in presenting the virtual object on the first display before receiving the launch command and in presenting the virtual object on the first display after receiving the launch command. The gesture may also be presented on the first display and a view of the virtual object and the spatial relationship to the gesture.

At 907, the virtual object may be presented on the first display as well as the gesture. Although this operation is not necessary, it may improve enjoyment or accuracy in launching the virtual object.

At 911, the trajectory of the virtual object from the first display toward the second is determined. This determination can take into consideration the user gesture to launch the virtual object, the interaction with any virtual bindings in launching the object, the nature of the object and how it is to travel, and the nature of the 3-D space into which the object is launched, such as virtual paths or roads, weather, other objects, etc.

At 913 guidance commands may be received from the user to guide the virtual object on its way to the second display. The guidance commands can be performed by performing gestures on a screen, in the air or with the first display directly such as by tilting or shaking the display. The guidance commands are applied to modify the determined trajectory and may include steering, velocity, acceleration, pitch, roll, and yaw commands. In one example, the guidance commands include user gestures determined by observing a user. The user can command using a direction in which his face is pointed, a direction in which his eyes are pointed, and a direction of the voice of the user. These can all be determined using cameras and microphones.

At 915, the virtual object is presented on the second display. This allows the virtual object to be launched from the first display sent to the second display and then sent back to the first display or to another display or to stop travel at the second display. The interaction of the user is improved by using two different displays.

Figure 10:
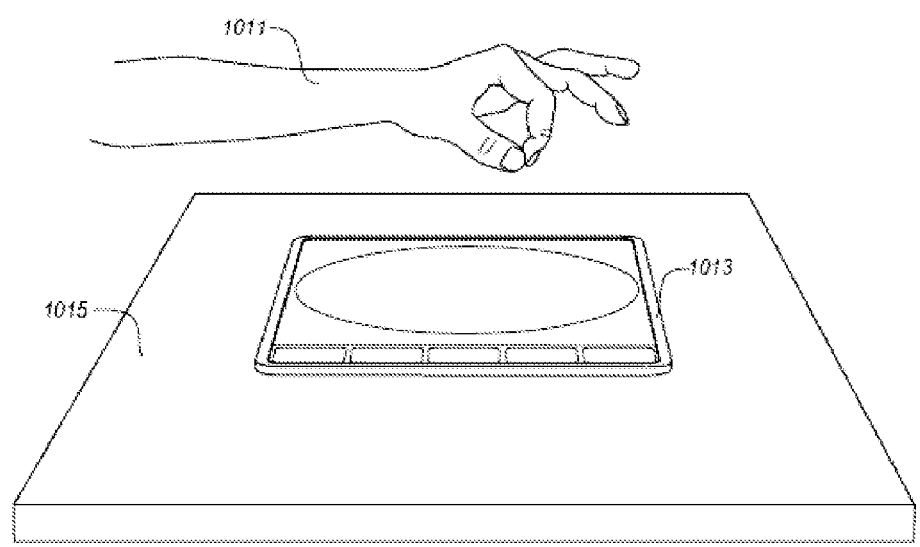
FIG. 10 illustrates side view of dropping a virtual object on to a screen according to an embodiment.

FIG. 10 shows a side view of how virtual reflections of the user can be used to enhance the interaction of a user with a computing device. In the example of FIG. 10, there is a single display, however, the interaction may also be used with the dual screen examples described above.

The first example below shows a game concept, "Cowboys and Goldfish." In this game the user 1011 selects a cowboy character by pinching the screen and virtually lifting the cowboy character off the screen. The user then moves his hand to an advantageous position to drop the cowboy on a goldfish. The goldfish may be a moving target to enhance the difficulty of the game. The displayed cowboys and goldfish may be animated to make various movements and noises to entertain the user. The system may track the user hand during and after lifting the virtual character, using various sensors, including but not limited to: a touch screen; a screen with embedded photonic sensors; one or more 2D cameras, a 3D camera, and ultrasonic sensors.

In FIG. 10, the user lifts cowboys off of a display 1013 that is resting on a table 1015. Sensors associated with the display observe the user's movements to create the game play. In FIG. 10, the user hand is shown as holding a virtual object, such as a virtual cowboy and ready to drop, throw, flick, bat, or shoot the virtual object toward an object displayed on the screen. While, all of the sensors and computing resources may be a part of the tablet or smart phone 1013, external sensors and processing resources may be used instead of or in addition to those of the illustrated display.

Figure 11:
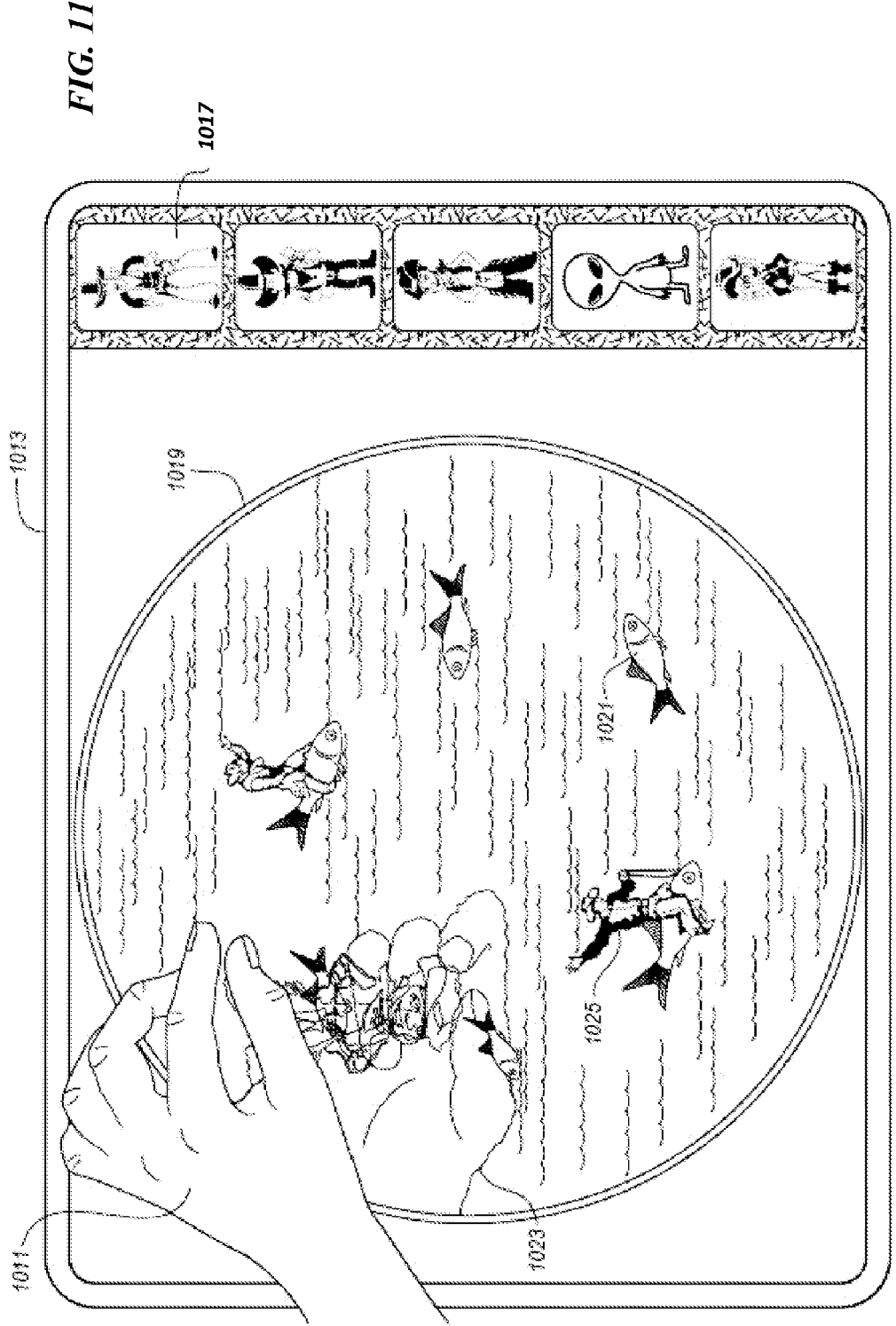
FIG. 11 illustrates a top view of dropping a virtual object on to a screen according to an embodiment.

In FIG. 11, the screen display of FIG. 10 is shown. Goldfish 1021 are swimming in a fish bowl 1019. The user 1011 is presented with a selection panel 1017 of different characters to be used in the game, such as different cowboys. After selecting a character using, for example, a touch screen gesture, the user may then lift the selected character from the screen as shown and then try to drop the cowboy 1025 onto one of the goldfish 1021.

Upon lifting the character, a virtual object corresponding to the character is generated and may be shown on the display. The display presents the virtual object as a reflection 1023 of the virtual object and the user hand. This reflection is presented as a reflection off the water at the top of the goldfish bowl 1019. In order to provide a more realistic effect, the reflection ends at the edge of the fish bowl. The same principles may be applied to other displayed reflective surface, such as glass, metal, other types of water surfaces, clouds, etc.

Similarly, the cowboys and goldfish are provided as an example, any of a variety of other characters and objects may be presented as options to launch at any other type of object or character. Typical examples include bombs and submarines, darts and targets, birds and worms, or any of a variety of different imaginary military and spaceship targets.

Using the sensors, the screen is able to show various virtual views of the user hands and objects and characters from the game that the hands virtually contain. In the Cowboys and Goldfish example, the user is virtually holding a cowboy and sees a reflection in the water that shows the hand holding a cowboy.

Figure 12:
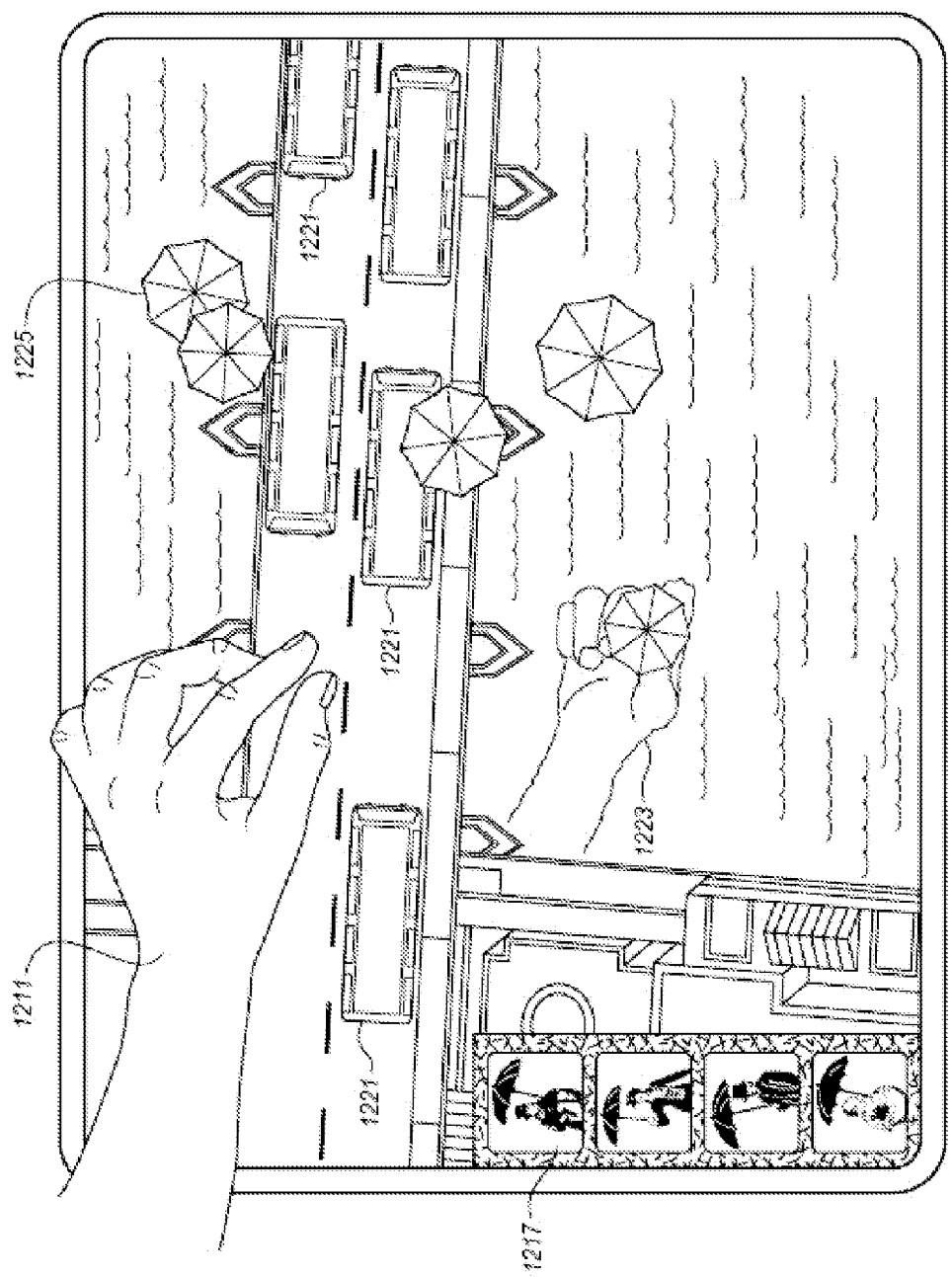
FIG. 12 illustrates top view of dropping a virtual object on to a screen according to another embodiment.

The same techniques may be applied to characters with parachutes or umbrellas being dropped onto a scene. The example of FIG. 12 shows a game in which the user tries to virtually drop characters 1225 onto moving buses 1223. The buses are moving across a bridge over a river. The water provides a surface upon which reflections may be rendered. The dropped characters float down using umbrellas as parachutes. As in the previous example, in the top view of FIG. 12 the hand (holding a character) is virtually reflected in the water. The screen rendering module based on the selected virtual object and observations of the user generates a reflection 1223 of the user and the virtual object. This allows the user to see possible effects of dropping or throwing the character in a particular direction. The user's actual hand 1211 is also shown for reference to see how the reflection 1223 of the hand relates to the rendered reflection in the water.

The virtual reflection can be created in any of a variety of different ways. In one example, the hand can actually be captured as an image, and the character from the game can be added to create a composite image. The hand can be detected and differentiated from the visual field of incoming. Elements may then be added to the captured image. In another example, using the approximate position of the hand, the system can display a hand model that matches the position of the real hand.

Figure 13:
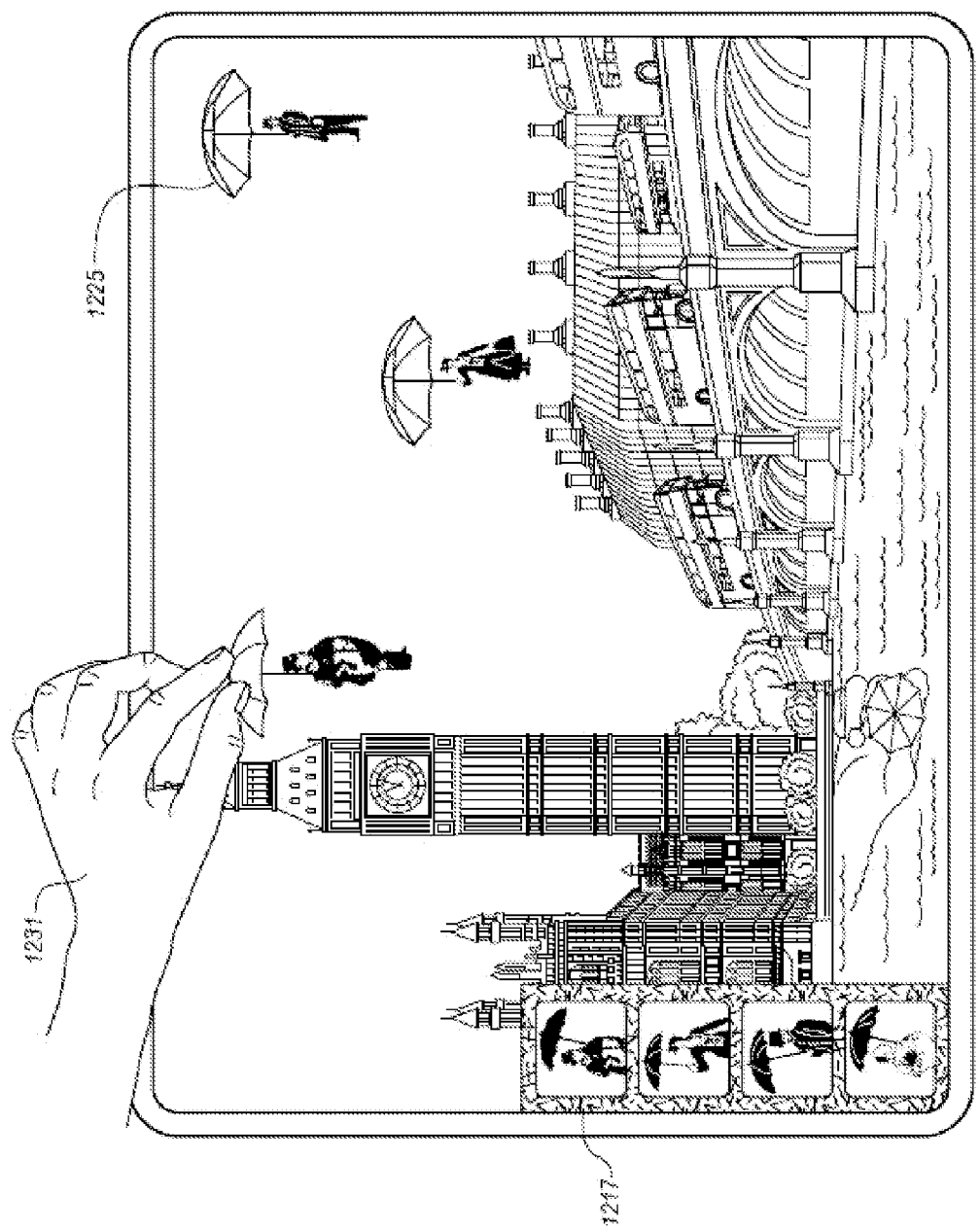
FIG. 13 illustrates top view of dropping a virtual object on to a screen according to another embodiment.

The side view of this game is presented in FIG. 13 showing the same user as a virtual hand 1231 in the sky holding a character. This view may be presented on a second screen as an optional view on the same screen or as a split screen with the view of FIG. 12. The user interaction may be enhanced with additional and alternative displays not shown here. The example displays are provided as examples and many other views may be presented to a user. In the displays of FIGS. 12 and 13, multiple released objects are shown floating simultaneously.

In another embodiment, one screen is used to create, edit and select an object or object attribute on one screen before throwing the object at another screen. The user can edit or build characters on the touch screen and then launch them toward another display, either by air-gesturing a pickup and throw toward a second screen or by using a gesture on the touch screen to gesture the launch. Further, the direction and tilt of the first screen, such as a tablet, may be used to determine an aim of an object.

Figure 14:
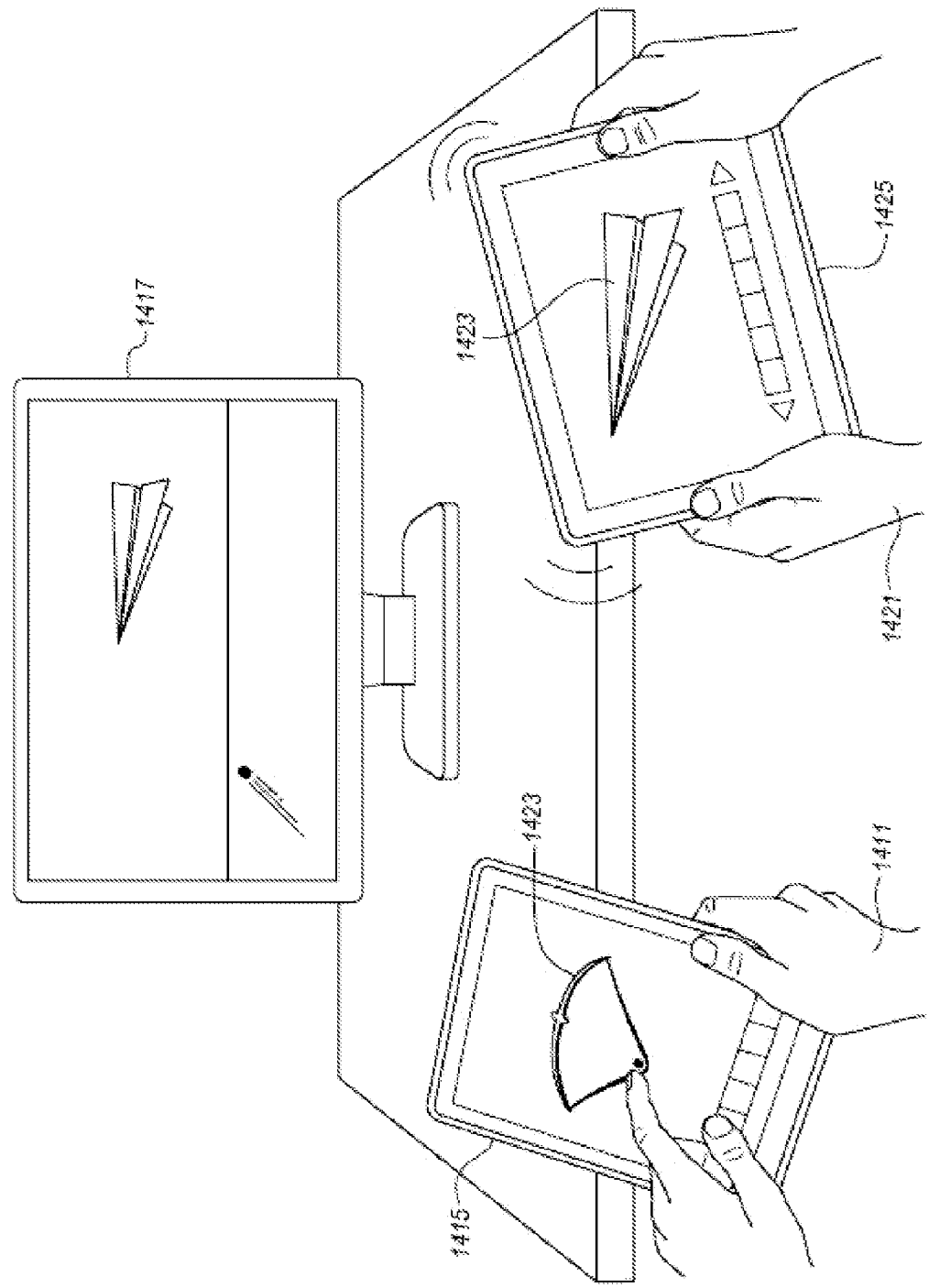
FIG. 14 illustrates a perspective view of controlling multiple virtual objects on a display.

Referring to FIG. 14, a first user 1411 launches a character from a tablet 1415 to a TV screen 1417 using a crossbow-like control 1413. Another user 1421 folds paper airplanes 1423 using a touch screen of another tablet 1425. The second user then launches the paper airplane toward the TV screen 1417. Multiple players can make and virtually throw objects in competitive or cooperative games. Further, after launching the virtual object toward the main screen 1417, the player can use the tablet as a controller to maneuver the plane as it flies on the second screen. While FIG. 14 focuses on two screens, three or more screens may be used for various versions of such games. Moreover, the TV screen 1417 may be any type of screen or display.

The embodiments described above allow for a multi-step method to enable games to be played using touch on one device to edit an object then virtually launch it to another screen. In one embodiment an IR (Infrared) emitter and receiver combination or an ultrasonic emitter and receiver may be used to detect the aim of the user. An accelerometer in the tablet may be used to detect tilt, in order to determine changes in a trajectory of the launched object. Other interactions may alternatively be used. For example, using the tablet as a steering wheel to drive a road presented on the tablet.

Such interaction may also be used with a virtual fly fishing interaction. In his case, the user might define a rod and configure a fly on a smaller handheld device. The user could then use the device as the rod to cast the fly toward the larger screen.

The example above integrates z-axis gesturing with x-y plane touch screen interactions to create, select, and edit a virtual object. Feedback is provided using augmented reality reflections on the screen during the z-axis gestures that are linked to inputs to the touch screen. The touch screen input or air gesture input allows characters to be selected and tracked on a nearby display. The characters may then be used to generate augmented reality representations on one or more screens.

Using both touch screen input and z-axis or air gestures as inputs allows a representation of the user hand and any virtual objects or characters that have been selected with the touch screen to be shown. A user may use a touch screen to select an object, followed by a gesture to throw that object toward another screen. Cameras and/or ultrasonic sensors associated with one or more of the screens possibly on different devices or external to all of the screen devices track the throw gestures or other gestures. In addition to the throw or launch, the tilt of a handheld device may be used to control an object as it moves toward another screen.

Figure 15:
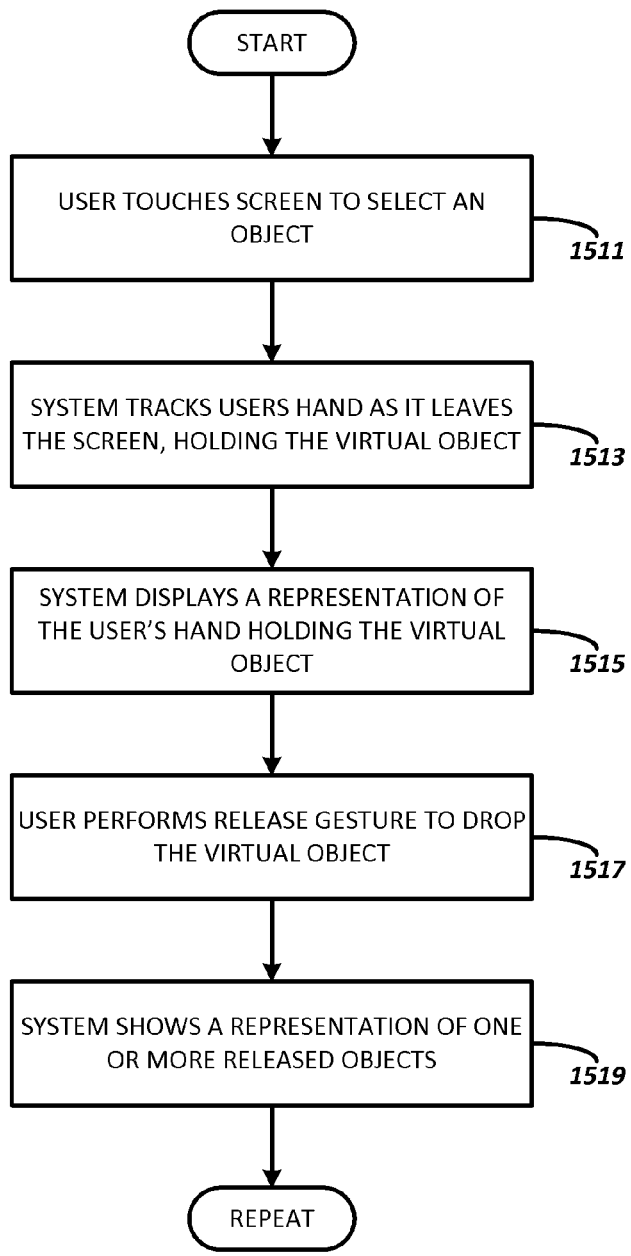
FIG. 15 illustrates a flow diagram of another method embodiment.

FIG. 15 is a process flow diagram of some of the described techniques combined into a single process flow. At 1511, the process starts and the user touches a screen to select an object. Alternatively, keypad or controller buttons may be used to select the object. The object may be a character, such as a cowboy, or an inanimate object, such as a paper airplane.

At 1513 the system tracks the user hand as it leaves the touch screen holding the virtual object. This may be done using sensors attached to the touch screen or attached to any of a variety of other devices. After generating a representation of the user and the virtual object, the system may then display a representation of the user hand holding the virtual object. This representation may be presented as a reflection or an alternate view of the virtual object and the user. While the examples above show a user hand and perhaps an arm, if other body parts are used for air gestures, then those other body parts may alternatively be shown, such as feet for a soccer game.

At 1515, the user performs a release or launch gesture to drop the virtual object or otherwise launch the virtual object. A variety of different examples are provided above, such as throwing, batting, or shooting the object. Virtual bindings may be used and a variety of different inertial and acceleration effects may be applied to the virtual object.

At 1517, the system shows a representation of one or more released objects on the relevant screens. Examples of these are the cowboys and umbrella parachutes described above. After the representations are generated and displayed, the process may return to launch more virtual objects.

Figure 16:
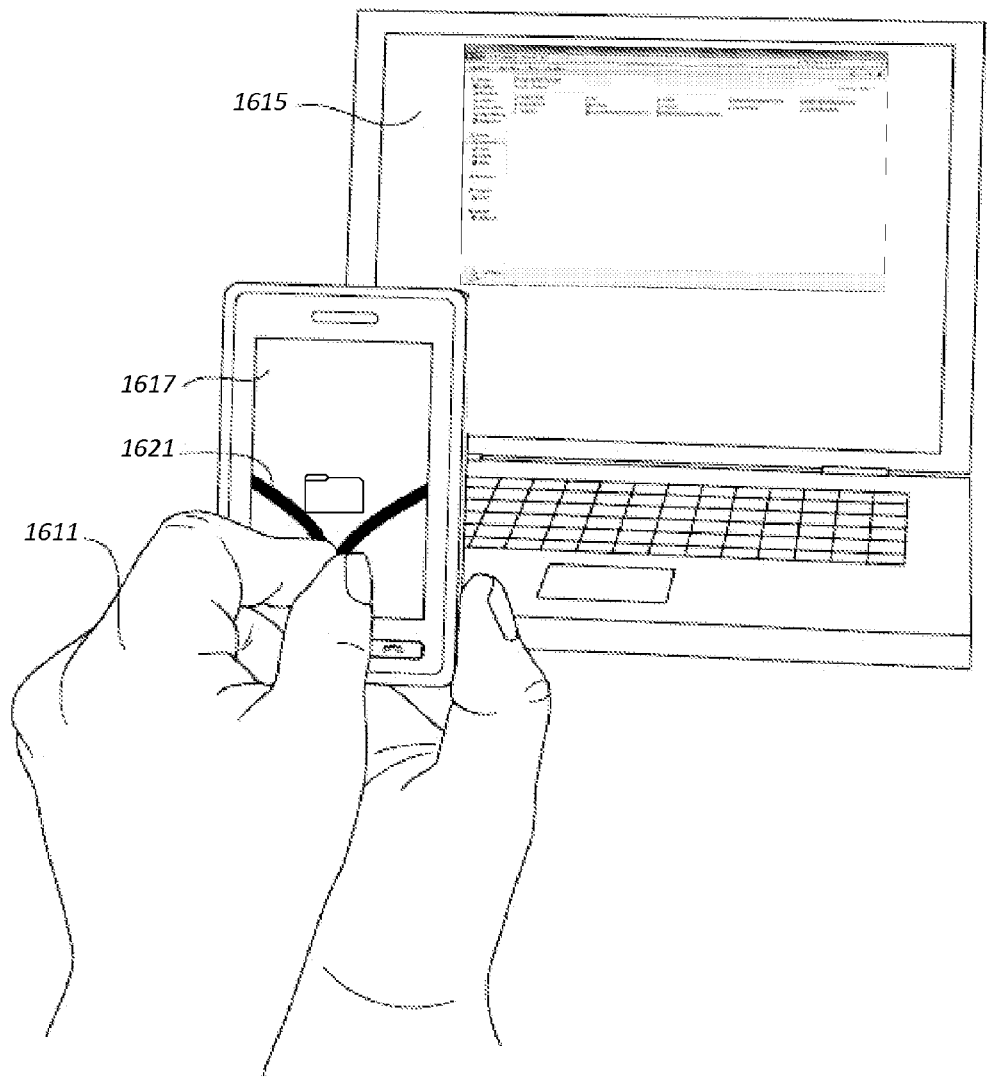
FIG. 16 illustrates a perspective view of transferring a virtual object from one computing device to another computing device.

In the above examples, the virtual object is depicted as a game piece for playing a game. However various embodiments are not limited in this and as previously discussed, the virtual object the VO may be a graphical representation of a file, a photo file, a video file, a music file, an email or contact data. Further, the graphical representation may be associated with a particular file, photo, video file, music file, email or contact that may be sent to another device. With reference to FIG. 16, the virtual object may be a graphical representation of a file on a display 1617 to transfer to a second device. The user may select or pick up the virtual object as similar discussed above with a pinching gesture using a body part 1611. A virtual binding 1621 may be created with the virtual object for sending to a second display 1615 of a second device. A user may aim and release the virtual object towards the second display 1615, and in particular, a specific area of the second 1615. As discussed above, the adjacent screen perspective 2 and the adjacent screen perspective module 2 may coordinate to determine a particular landing area for the virtual object. The second display 1615 may show an open file folder location for the file to be transferred or sent to and an indication may be displayed that the virtual object will land in this open file folder location. The user may then release the virtual object and the virtual object may be rendered on the second screen 1615 in a manner as similarly discussed above. In addition, information or data associated with the virtual object may also be sent or transferred to the second device with the second display 1615. This information may be sent to the second device via any wired or wireless networking means or connections. In another example, a user may send an email or contact data in a similar manner using virtual objects.

Figure 17:
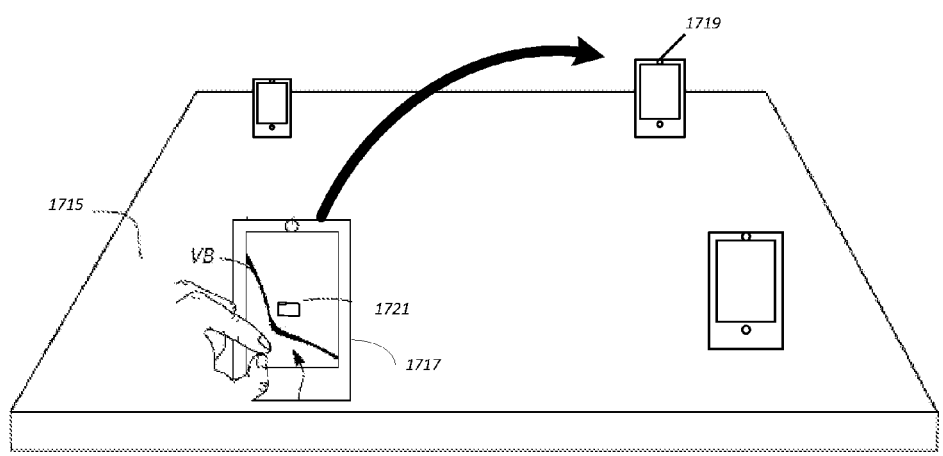
FIG. 17 illustrates perspective view of transferring a virtual object from one computing device to one or a plurality of computing devices.

FIG. 17 illustrates another embodiment for sending to virtual object from a display 1721 of a first device 1717 to a second display of a second device 1719 across a table 1715. As previously discussed, more than one device may be detected by the adjacent screen perspective module and device proximity detection module. The first device 1717 may detect other devices and may determine which of the other devices it is facing and to send the virtual object to. As previously discussed, the adjacent screen perspective module may determine the relative angle of the first device's display screen to the receiving device's display screen. For example, the use of an accelerometer could allow determining the angle at which the first device 1717, e.g. sending device, is being held while infrared or ultrasound could allow determination of orientation of the first device 1717 in relation to the sensors on the second device 1719. This information can then be used to determine which of the plurality of devices is the target or the receiving device. In a similar fashion, the other devices may determine which one of the devices (receiving/targeting device) the sending device is facing by utilizing an accelerometer and sensors to prepare for receiving the virtual object. The virtual object may then be transferred or sent to the second device 1719 and rendered on the screen of the second device.

Figure 1B:
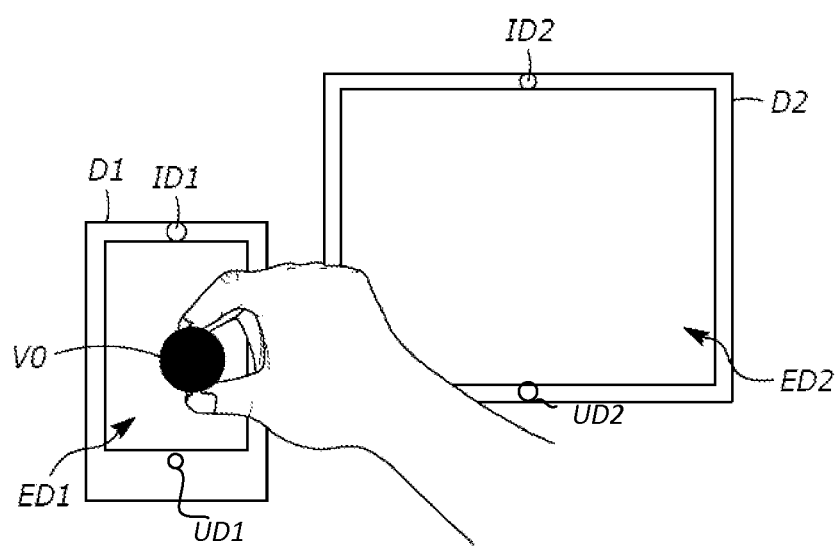
Figure 1C:
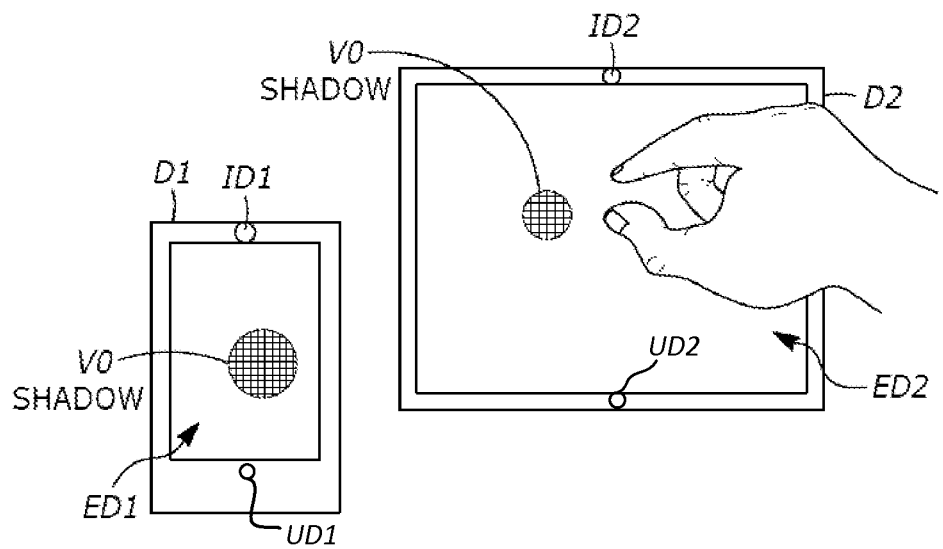
Figure 1D:
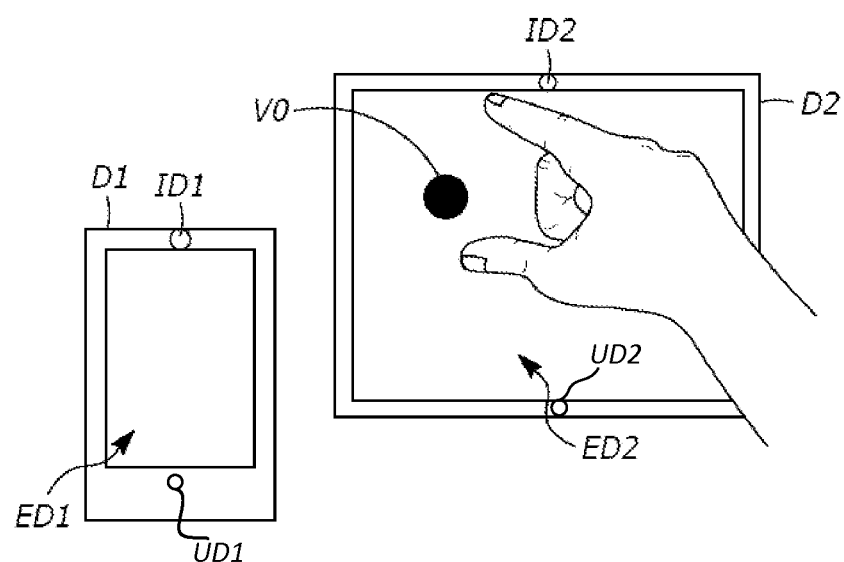
Figure 1E:
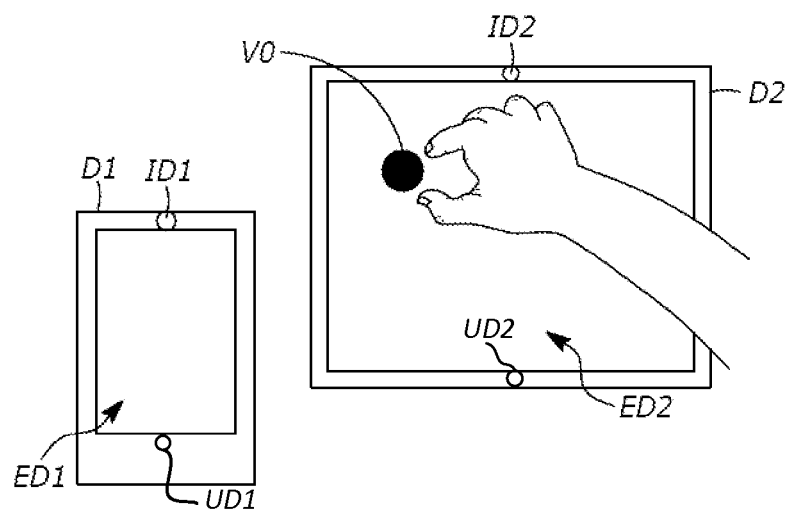
Figure 1F:
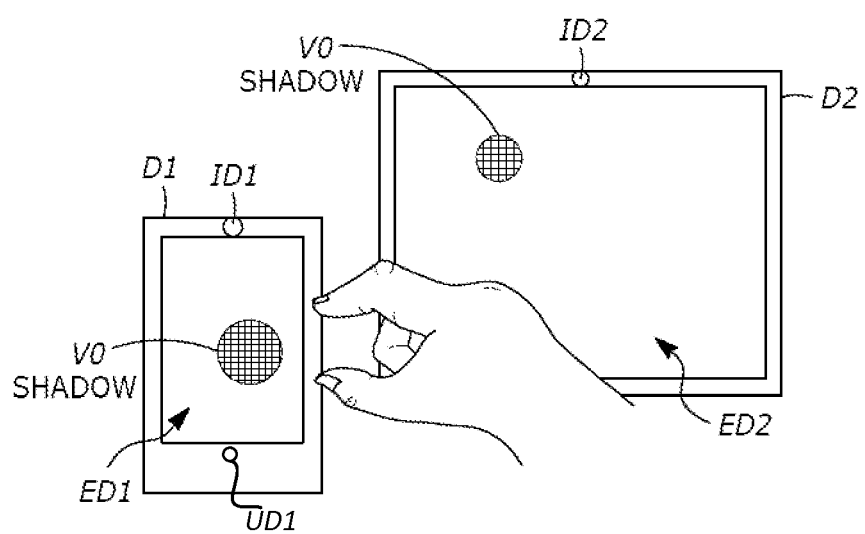
Figure 1G:
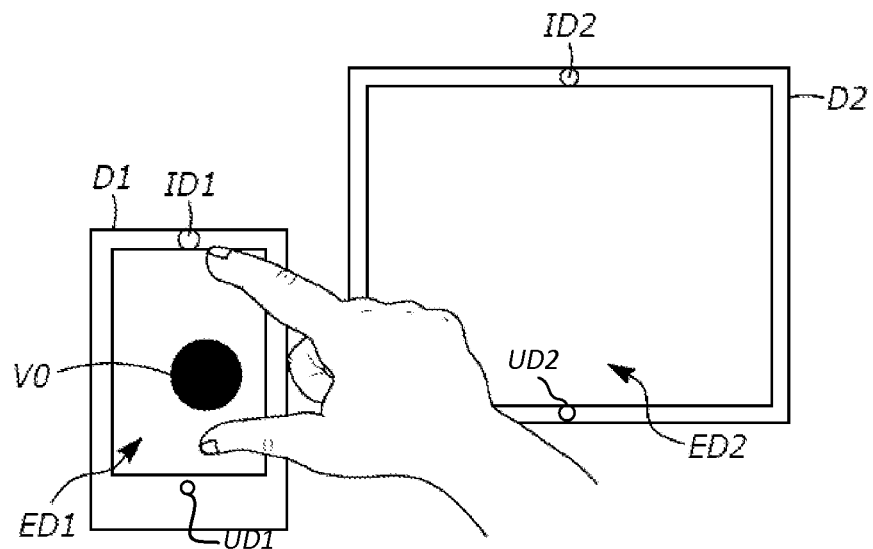
Figure 1H:
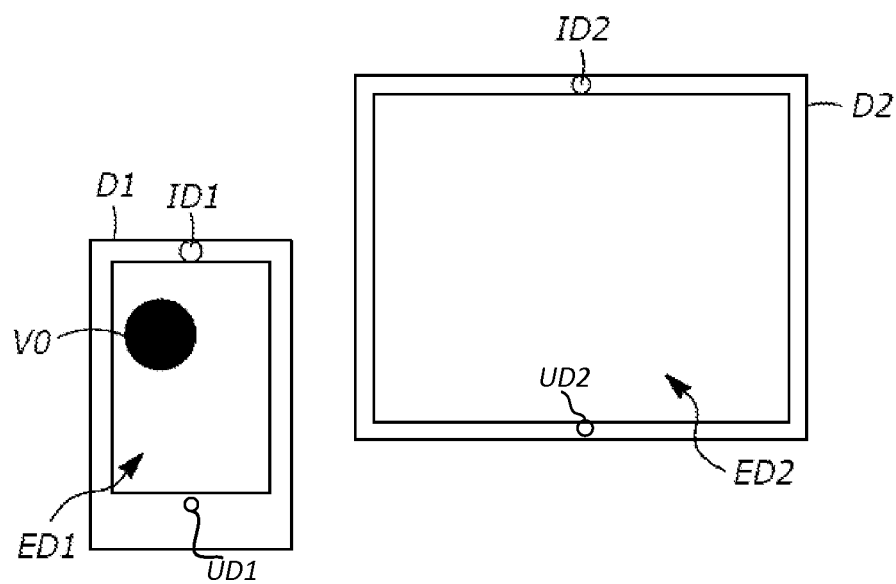

Now with reference to FIG. 1A, a virtual object VO appears on the screen of ED1 of device D1, which in this embodiment comprises a smartphone device as previously noted. The user hand is shown in FIG. 1A as moving toward VO, and as being about to pinch and lift it from ED1. Referring next to FIG. 1B, the user hand is shown as pinching VO in order to acquire it, virtually, between its thumb and finger, through a touch screen pinch gesture. The Touch Screen Sensor System of FIGS. 4A and 4B may be active at this point to sense and interpret the interactions between the user hand and the screen of ED1. Referring next to FIG. 1C, the user hand is depicted as still virtually holding the VO, having moved the same to a location over the screen of ED2, that is, over the screen of the notebook display. At least from the time the user hand leaves its contact position with respect to the screen of ED1, ID1, ID2, UD1, or UD2 or all detectors may track its air movements interacting with the VO, using GCS1 and/or GCS2 as described with respect to FIGS. 4A and 4B above. Thus, by the time the user hand is disposed over the notebook display ED2, a shadow of the VO may be shown in ED1 at the location where the user hand acquired the same, and a shadow of the VO may be also shown in ED2 at an optional target release location of the VO on ED2 before the VO is actually moved to ED2. Referring next to FIG. 1D, the user hand is shown as making a pinch-release gesture, which may be captured by ID2/UD2 in order to effect a virtually release of the VO onto ED2 as shown. As a result of the release gesture, the VO, with underlying properties and data, is effectively moved from D1 to D2 by way of being moved from ED1 to ED2. Referring next to FIG. 1E, the user hand is shown as being disposed close to the screen of ED2 in order to reacquire VO on ED2. In the depiction of FIG. 1E, the user hand makes a air pinching gesture, which may be captured by ID1/UD1 or ID2/UD2 as an acquiring gesture with respect to VO. Referring next to FIG. 1F, the user hand is depicted as still virtually holding the VO, having moved the same to a location over the screen of ED1, that is, over the screen of the smartphone display. By the time the user hand is disposed over the notebook display ED2, a shadow of the VO may be shown in ED2 at the location where the user hand acquired the same, and a shadow of the VO may be also shown in ED1 at an optional target release location of the VO on ED1 before the VO is actually moved to ED1. Referring next to FIG. 1G, the user hand is shown as making a pinch-release gesture, which may be captured by ID2/UD2 in order to effect a virtually release of the VO onto ED2 as shown. As a result of the release gesture, the VO, with underlying properties and data, may be effectively moved back from D2 to D1 by way of being moved from ED2 to ED1. Referring next to FIG. 1H, the VO is shown as having moved from its release location, by virtue of inertia capabilities of GCS1 (FIG. 4A/4B) associated with D1, which effects a continued movement of the VO across the screen of ED1 based on the dynamics of the user hand release gestures and virtual properties of the VO. Throughout the process as depicted in FIGS. 1A-1H, GCS1 and GCS2 as described with respect to FIGS. 4A/4B may be active to track the user hand movements to effect a movement of the VO beyond a given display.

Referring next to FIGS. 2A-2D, another embodiment is depicted where a user hand or hands are effective to create a virtual binding on an electronic display that may be effective to move a VO from the display to another display. As depicted in FIG. 2A, a user hand may pinch on a screen, for example at a corner thereof, and, as depicted in FIG. 2B, the user hand may then move the pinched fingers back from the screen of ED1, at which time a virtual binding virtual binding may appear to protrude from the screen of ED1 as shown, enhanced with 3D. As shown in FIG. 2B, and as explained above, a virtual binding may comprise a 3D virtual tether between the fingers and the VO being manipulated. A virtual binding may thus provide a simulation of motion memory with respect to a user body part movements, being critical in providing visual feedback to the user regarding the user's movements. A virtual binding may for example appear in the form of one or more virtual tethers or a virtual wall. A virtual binding may for example be embodied as a cross-bow or a sling shot, or having a shape of any other virtual object that may be used to move an object from one virtual location to another. Referring next to FIG. 2C, the user may intercept the virtual binding with the other hand, by for example making a pinching gesture with respect to the same as shown. Such an interaction with the virtual binding may cause the virtual binding to bend, and hence to for example pull VO toward itself as the virtual binding stretches toward to the user's other hand. Thus, interaction with the virtual binding may cause changes to the characteristics of the virtual binding, such as its dynamic properties (kinetic energy, target direction, etc). Referring next to FIG. 2D, the user's other hand is seen as effecting a releasing gesture with respect to the virtual binding, which, in the shown example, causes the VO to appear now on ED2 according to inertial properties of the same. Throughout the process as depicted in FIGS. 2A-2D, GCS1 and GCS2 as described with respect to FIG. 4A/4B may be active to track the user hand movements to effect a movement of the VO beyond a given display.

Referring next to FIGS. 3A-3C, an alternative embodiment is depicted, where a VO is moved beyond an electronic display by being moved to a bezel region of a screen. By "bezel," what is meant in the instant description is a region that is at the rim or edge of a display. A VO may for example be moved to a bezel of a device in the case of space constraints on the device display, or for other reasons. Referring first to FIG. 3A, a user hand virtually acquires a VO between a thumb and a finger through a touch screen pinch gesture on ED1, as previously described with respect to FIG. 1B. Referring next to FIG. 3B, a user hand may gesture the pinch fingers to a bezel region of the screen beyond ED1 as shown. Next, as seen in FIG. 3C, the user hand may make a pinch-release gesture at the bezel region as shown, which gesture may release the VO in the bezel region of D1. A marker M may then show a location of the VO placed on the bezel of D1. Throughout the process as depicted in FIGS. 3A-3C, a gesture capture system similar to GCS1 as shown in FIGS. 4A/4B may be active to track the user hand movements to effect a movement of the VO beyond ED1 and to the bezel region.

With respect to the embodiments of FIGS. 1A-1H, FIGS. 2A-2D and FIGS. 3A-3C, while only certain specific hand movements and gestures are depicted to effect corresponding desired results, embodiments are not so limited, and encompass within their scope a tailoring of the gesture capture systems to any set of gestures as applicable, whether by hand or otherwise, to effect a movement of a VO beyond a given display. For example, a VO could be batted or flicked toward another display, or a flick of the index finger from the thumb for example could denote a wish for cross-screen movement of a VO. In the alternative, to indicate that a cross-screen event is desired, a user could first enter a mode through a gesture or touch on a button on a given device. The noted embodiments may further allow a transferring of inertial properties of a release gesture to the behavior of a VO once it has been released onto a new display (such as, for example, by being virtually splattered or flattened), and, according to one embodiment, such a gesture capture system as described with respect to FIGS. 4A/4B may be adapted to allow an interaction of such a VO, based on its inertial properties, with other objects on the new screen.

In addition, with respect to the embodiment of FIGS. 2A-2D, it is not necessary for a virtual binding to be controlled by two hands, and embodiments encompass the manipulation of a virtual binding in any other manner, such as, for example, by a single hand virtual binding could further be depicted in 3D or not, and could for example be manipulated using gestures other than those depicted in the figures, such as, for example, through shaking a hand to delete a virtual binding or cutting them with another hand. Moreover, virtual bindings and cross-display movements could occur according to an embodiment without the user having to touch the display, such as through air movements of a user hands.

It is further noted with respect to embodiments that although the described embodiments of FIGS. 1A-1H, 2A-2D and 3A-3C pertain to using hand gestures to manipulate a VO, embodiments are not so limited, and include within their scope the use of movements of any body part(s) to manipulate a VO, and also to the use of different body parts tethered to different parts of a VO, such as through virtual bindings. The body part could include any part of a body, such as a hand, a foot, a head, eyes, legs, arms, etc.

Referring next to FIG. 5A, a flowchart is shown for a method embodiment. According to FIG. 5A, a method 500 may include, at block 510, receiving input data from an image detector, the input data including data obtained from tracking air movements of a user body part interacting with a virtual object of an electronic display, and at block 520, mapping the input data to a control input to move the virtual object beyond the display.

Figure 5B:
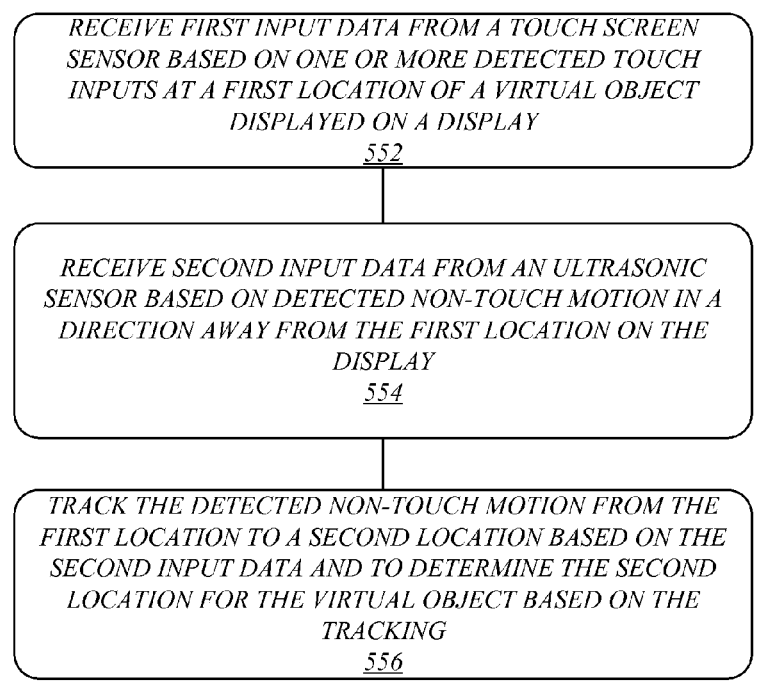

With respect to FIG. 5B, a flowchart is shown for a second method embodiment. According to FIG. 5B, method 550 may include, at block 552, receiving first input data from a touch screen sensor based on one or more detected touch inputs at a first location of a virtual object displayed on a display. Further, at block 554, the method may include receiving second input data from an ultrasonic sensor based on detected non-touch motion in a direction away from the first location on the display. Finally, at block 554, the method may include tracking the detected non-touch motion from the first location to a second location based on the second input data and to determine the second location for the virtual object based on the tracking.

Advantageously, an embodiment allows gesture recognition, such as by way of a combination of touch and air gestures, to permit a user to virtually acquire a virtual object, and to move it across screens or to a bezel region of a display. An embodiment further allows the use of gesture recognition to allow a user to virtually throw or shoot a virtual object from one screen to another screen, optionally preserving the inertial properties of the user's release movement in the dynamic behavior of the virtual object on the new screen. Moreover, advantageously, an embodiment allows gesture recognition to allow a user to control the behavior of a virtual object by making gestures through virtual bindings, especially for example, after having just having placed the virtual object on the screen through a gesture. Virtual bindings provide realtime visual feedback to link the cognitive processes and tactile expectations experienced with physical object manipulation with graphical emulations experienced virtually. For example, virtual bindings advantageously allow a virtual object to be manipulated by body part movements, such as by being moved, pushed down to be flattened or enlarged, to otherwise manipulated through a puppet-string like control. Moreover, advantageously, an embodiment allows multiple points on the same user to be bound to various elements on a display with virtual bindings (for example, a virtual binding could appear on the screen for each of multiple fingers, or for each arm and each leg, etc). The virtual objects thus bound could subsequently advantageously be controlled with coordinated gestures of the multiple points on the user.

According to some embodiments, a user may advantageously be able to bounce a virtual object from one display to another. The user could for example be holding a VO, and throw it toward a display. The VO would bounce off of the first display and then go to the other display and potentially come back to the first display. An embodiment of an apparatus already described would thus enable tracking of gestures, position, and physics of the virtual objects. In the realm of some embodiments, the user could also launch a virtual projectile from one screen to another. With a handheld device with screen, the user could draw back a VO, showing virtual binding's, then release the VO to virtually bounce off the screen of the handheld device the user is holding and toward a second display. In such a system, the user could select a VO with the touch screen (the selection could automatically move to a virtual binding to manipulate the VO, or the user could simply drag the VO, depending on the game). The selected VO could be launched as a projectile using the virtual binding. In playing games with such a system, the first system could track the progress of the game to a point then pass parameters (via direct wireless connection or over network) to the second device, which would then pick up the game from that point. In the virtual binding scenarios, the user could use voice commands to change the nature of the object to be launched (color, category, capabilities) or to change the nature of how it is launched, or to change the view that appears on the displays as the user does it. Alternatively, secondary movements such as eye tracking could be used to influence a targeting and physics of the virtual object. According to one option, a user could use the system to scan a real object then use it in the virtual world as a VO.

Figure 18:
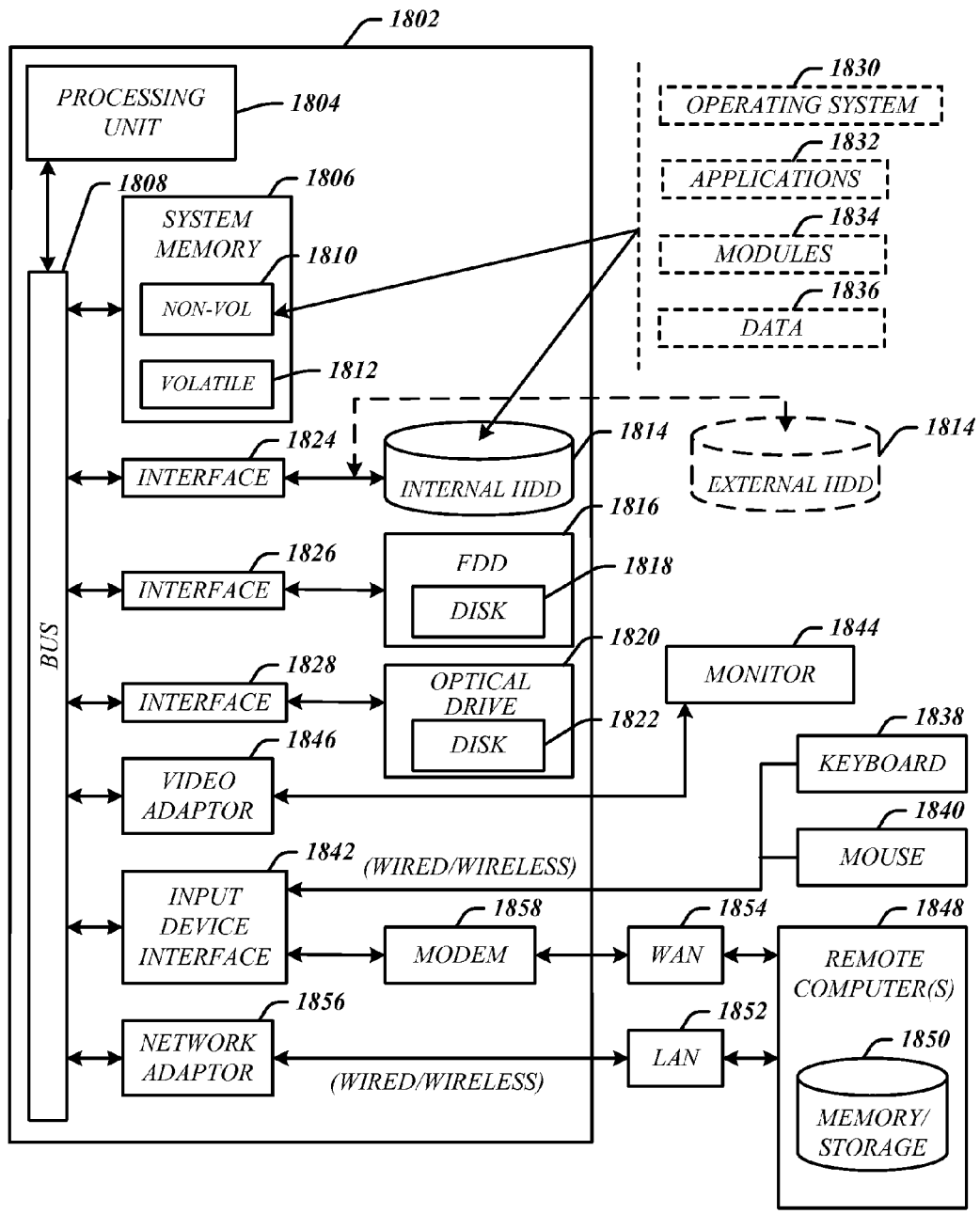
FIG. 18 illustrates an embodiment of a first computing architecture.

FIG. 18 illustrates an embodiment of an exemplary computing architecture 1800 suitable for implementing various embodiments as previously described. In one embodiment, the computing architecture 1800 may comprise or be implemented as part of computing devices D1 and D2.

As used in this application, the terms "system" and "component" are intended to refer to a computer-related entity, either hardware, a combination of hardware and software, software, or software in execution, examples of which are provided by the exemplary computing architecture 1800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1800.

As shown in FIG. 18, the computing architecture 1800 comprises a processing unit 1804, a system memory 1806 and a system bus 1808. The processing unit 1804 can be any of various commercially available processors.

The system bus 1808 provides an interface for system components including, but not limited to, the system memory 1806 to the processing unit 1804. The system bus 1808 can be any of several types of bus structure that may further interconnect to a memory bus (with or without a memory controller), a peripheral bus, and a local bus using any of a variety of commercially available bus architectures. Interface adapters may connect to the system bus 1808 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International 1800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 18, the system memory 1806 can include non-volatile memory 1810 and/or volatile memory 1812. A basic input/output system (BIOS) can be stored in the non-volatile memory 1810.

The computer 1802 may include various types of computer-readable storage media in the form of one or more lower speed memory units, including an internal (or external) hard disk drive (HDD) 1814, a magnetic floppy disk drive (FDD) 1816 to read from or write to a removable magnetic disk 1818, and an optical disk drive 1820 to read from or write to a removable optical disk 1822 (e.g., a CD-ROM or DVD). The HDD 1814, FDD 1816 and optical disk drive 1820 can be connected to the system bus 1808 by a HDD interface 1824, an FDD interface 1826 and an optical drive interface 1828, respectively. The HDD interface 1824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1810, 1812, including an operating system 1830, one or more application programs 1832, other program modules 1834, and program data 1836. In one embodiment, the one or more application programs 1832, other program modules 1834, and program data 1836 can include, for example, the various applications and/or components of a system.

A user can enter commands and information into the computer 1802 through one or more wire/wireless input devices, for example, a keyboard 1838 and a pointing device, such as a mouse 1840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1804 through an input device interface 1842 that is coupled to the system bus 1808, but can be connected by other interfaces such as a parallel port, IEEE 1394 serial port, a game port, a USB port, an IR interface, and so forth.

A monitor 1844 or other type of display device is also connected to the system bus 1808 via an interface, such as a video adaptor 1846. The monitor 1844 may be internal or external to the computer 1802. In addition to the monitor 1844, a computer typically includes other peripheral output devices, such as speakers, printers, and so forth.

The computer 1802 may operate in a networked environment using logical connections via wire and/or wireless communications to one or more remote computers, such as a remote computer 1848. The remote computer 1848 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1850 is illustrated. The logical connections depicted include wire/wireless connectivity to a local area network (LAN) 1852 and/or larger networks, for example, a wide area network (WAN) 1854. Such LAN and WAN networking environments are commonplace in offices and companies, and facilitate enterprise-wide computer networks, such as intranets, all of which may connect to a global communications network, for example, the Internet.

When used in a LAN networking environment, the computer 1802 is connected to the LAN 1852 through a wire and/or wireless communication network interface or adaptor 1856. The adaptor 1856 can facilitate wire and/or wireless communications to the LAN 1852, which may also include a wireless access point disposed thereon for communicating with the wireless functionality of the adaptor 1856.

When used in a WAN networking environment, the computer 1802 can include a modem 1858, or is connected to a communications server on the WAN 1854, or has other means for establishing communications over the WAN 1854, such as by way of the Internet. The modem 1858, which can be internal or external and a wire and/or wireless device, connects to the system bus 1808 via the input device interface 1842. In a networked environment, program modules depicted relative to the computer 1802, or portions thereof, can be stored in the remote memory/storage device 1850. It will be appreciated that the network connections shown are exemplary and other means of establishing a communications link between the computers can be used.

The computer 1802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the computing devices as previously described with reference to FIGS. 1-18 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through thirty-two (1-32) provided below are intended to be exemplary and non-limiting.

In a first example, a computing device to detection motion may include a processor component, a touch screen module for execution on the processor component to receive first input data from a touch screen sensor based on one or more detected touch inputs at a first location of a virtual object presented on a display, an ultrasonic input module for execution on the processor component to receive second input data from an ultrasonic sensor based on detected non-touch motion associated with the virtual object, and a virtual object tracker module for execution on the processor component to track the detected non-touch motion from the first location on the display to a second location in a direction away from the display based on the second input data.

In a second example, a computing device to detect motion may have one or more touch inputs comprising a touch gesture to select the virtual object and the non-touch motion comprising a directional motion to indicate movement of the virtual object on a plane different than a display plane.

In a third example, a computing device to detect motion may include an object and gesture recognition module for execution on the processor component to determine a gesture associated with the non-touch motion based on the second input data.

In a fourth example, a computing device to detect motion may have the virtual object tracker module to track the non-touch motion based on information received from the object and gesture recognition module and to determine the second location based on the information.

In a fifth example, a computing device to detect motion may include a virtual object tracker module to determine that the virtual object is released at the second location based on the second input data and the gesture.

In a sixth example, the computing device to detect motion may include an object velocity and directional module for execution on the processor component to determine one or more of a trajectory and a velocity of the virtual object based on information received from the virtual object tracker module.

In a seventh example, the computing device to detect motion may include a virtual object behavior module for execution on a processor component to detect movement of the virtual object to the second location based on information received from the object velocity and directional module. The computing device to detect motion may also include a screen rendering module for execution on the processor component to change a rendering of the virtual object from a first rendering associated with the first location to a second rendering associated with the second location.

In an eighth example, the computing device to detect motion may include an ultrasonic sensor to detect motion at a distance from the display of 10 centimeters or less.

In a ninth example, an apparatus may include a housing to house one or more components of the apparatus, the housing comprising a bezel surrounding the display and an ultrasonic sensor arranged within the bezel of the housing.

In a tenth example, the computing device to detect motion may include a virtual object that may comprise at least one of an image, an application, a file, a photo, a video file, an email or contact data.

In an eleventh example, a computer-implemented method may include receiving first input data from a touch screen sensor based on one or more detected touch inputs at a first location of a virtual object presented on a display, receiving second input data from an ultrasonic sensor based on detected non-touch motion associated with the virtual object; and tracking the detected non-touch motion from the first location to a second location the detected non-touch motion from the first location on the display to a second location in a direction away from the display based on the second input data based on the second input data.

In a twelfth example, a computer-implemented method may include one or more touch inputs comprising a touch gesture to select the virtual object and the non-touch motion comprising a directional motion to indicate movement of the virtual object on a plane different than a display plane.

In a thirteenth example, a computer-implemented method may include determining a gesture associated with the non-touch motion based on the second input data.

In a fourteenth example, a computer-implemented method may include tracking the non-touch motion based on information received from the object and gesture recognition module and to determine the second location based on the information.

In a fifteenth example, a computer-implemented method may include determining that the virtual object is released at the second location based on the second input data and the gesture.

In a sixteenth example, a computer-implemented method may include determining one or more of a trajectory and a velocity of the virtual object based on information received from the virtual object tracker module.

In a seventeenth example, a computer-implemented method may include detecting movement of the virtual object to the second location based on information received from the object velocity and directional module and changing a rendering of the virtual object from a first rendering associated with the first location to a second rendering associated with the second location.

In a eighteenth example, an article may include a computer-readable storage medium containing a plurality of instructions that when executed enable a processing circuit to receive first input data from a touch screen sensor based on one or more detected touch inputs at a first location of a virtual object presented on a display, receive second input data from an ultrasonic sensor based on detected non-touch motion associated with the virtual object, track the detected non-touch motion from the first location to a second location in a direction away from the display based on the second input data.

In a nineteenth example, an article may include a computer-readable storage medium containing a plurality of instructions that when executed enable a processing circuit to receive first input data from a touch screen sensor based on one or more detected touch inputs at a first location of a virtual object presented on a display, receive second input data from an ultrasonic sensor based on detected non-touch motion associated with the virtual object, the one or more touch inputs comprising a touch gesture to select the virtual object and the non-touch motion comprising a directional motion to indicate movement of the virtual object on a plane different than a display plane.

In a twentieth example, an article may include a computer-readable storage medium containing a plurality of instructions that when executed enable a processing circuit to determine a gesture associated with the non-touch motion based on the second input data.

In a twenty-first example, an article may include a computer-readable storage medium containing a plurality of instructions that when executed enable a processing circuit to track the non-touch motion based on information received from the object and gesture recognition module and to determine the second location based on the information.

In a twenty-second example, an article may include a computer-readable storage medium containing a plurality of instructions that when executed enable a processing circuit to determine that the virtual object is released at the second location based on the second input data and the gesture.

In a twenty-third example, an article may include a computer-readable storage medium containing a plurality of instructions that when executed enable a processing circuit to determine one or more of a trajectory and a velocity of the virtual object based on information received from the virtual object tracker module.

In twenty-fourth example, an article may include a computer-readable storage medium containing a plurality of instructions that when executed enable a processing circuit to detect movement of the virtual object to the second location based on information received from the object velocity and directional module and change a rendering of the virtual object from a first rendering associated with the first location to a second rendering associated with the second location.

In a twenty-fifth example, an apparatus may include means for receiving first input data from a touch screen sensor based on one or more detected touch inputs at a first location of a virtual object displayed on a display, means for receiving second input data from an ultrasonic sensor based on detected non-touch motion associated with the virtual object and means for track the detected non-touch motion from the first location on the display to a second location in a direction away from the display based on the second input data.

In a twenty-sixth example, an apparatus may include means for receiving first input data from a touch screen sensor based on one or more detected touch inputs at a first location of a virtual object presented on a display, means for receiving second input data from an ultrasonic sensor based on detected non-touch motion associated with the virtual object, the one or more touch inputs comprising a touch gesture to select the virtual object and the non-touch motion comprising a directional motion to indicate movement of the virtual object on a plane different than a display plane.

In a twenty-seventh example, an apparatus may include means for determining a gesture associated with the non-touch motion based on the second input data.

In a twenty-eighth example, an apparatus may include means for tracking the non-touch motion based on information received from the object and gesture recognition module and to determine the second location based on the information.

In a twenty-ninth example, an apparatus may include means for determining that the virtual object is released at the second location based on the second input data and the gesture.

In a thirty example, an apparatus may include means for determining one or more of a trajectory and a velocity of the virtual object based on information received from the virtual object tracker module.

In a thirty-first example, an apparatus may include means for detecting movement of the virtual object to the second location based on information received from the object velocity and directional module; and In a thirty-second example, an apparatus may include means for changing a rendering of the virtual object from a first rendering associated with the first location to a second rendering associated with the second location.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computing device to detect motion comprising:
   a processor component;
   a touch screen module for execution on the processor component to receive first input data from a touch screen sensor based on one or more detected touch inputs at a first location of a virtual object presented on a display;
   an ultrasonic input module for execution on the processor component to receive second input data from an ultrasonic sensor based on detected non-touch motion associated with the virtual object; and
   a virtual object tracker module for execution on the processor component to track the detected non-touch motion from the first location on the display to a second location in a direction away from the display based on the second input data.

2. The computing device of claim 1, the one or more touch inputs comprising a touch gesture to select the virtual object and the non-touch motion comprising a directional motion to indicate movement of the virtual object on a plane different than a display plane.

3. The computing device of claim 1, comprising:
   an object and gesture recognition module for execution on the processor component to determine a gesture associated with the non-touch motion based on the second input data.

4. The computing device of claim 3, the virtual object tracker module to track the non-touch motion based on information received from the object and gesture recognition module and to determine the second location based on the information.

5. The computing device of claim 4, the virtual object tracker module to determine that the virtual object is released at the second location based on the second input data and the gesture.

6. The computing device of claim 1, comprising an object velocity and directional module for execution on the processor component to determine one or more of a trajectory and a velocity of the virtual object based on information received from the virtual object tracker module.

7. The computing device of claim 6, comprising:
   a virtual object behavior module for execution on the processor component to detect movement of the virtual object to the second location based on information received from the object velocity and directional module; and
   a screen rendering module for execution on the processor component to change a rendering of the virtual object from a first rendering associated with the first location to a second rendering associated with the second location.

8. The computing device of claim 1, the ultrasonic sensor to detect motion at a distance from the display of 10 centimeters or less.

9. The computing device of claim 1, comprising:
   a housing to house one or more components of the apparatus, the housing comprising a bezel surrounding the display and the ultrasonic sensor arranged within the bezel of the housing.

10. The computing device of claim 1, the virtual object comprising at least one of an image, an application, a file, a photo, a video file, an email or contact data.

11. A computer-implemented method, comprising:
    receiving first input data from a touch screen sensor based on one or more detected touch inputs at a first location of a virtual object presented on a display;
    receiving second input data from an ultrasonic sensor based on detected non-touch motion associated with the virtual object; and
    tracking the detected non-touch motion from the first location to a second location the detected non-touch motion from the first location on the display to a second location in a direction away from the display based on the second input data.

12. The method of claim 11, the one or more touch inputs comprising a touch gesture to select the virtual object and the non-touch motion comprising a directional motion to indicate movement of the virtual object on a plane different than a display plane.

13. The method of claim 11, comprising:
    determining a gesture associated with the non-touch motion based on the second input data.

14. The method of claim 13, comprising:
    tracking the non-touch motion based on information received from the object and gesture recognition module and to determine the second location based on the information.

15. The method of claim 14, comprising:
    determining that the virtual object is released at the second location based on the second input data and the gesture.

16. The method of claim 11, comprising:
    determining one or more of a trajectory and a velocity of the virtual object based on information received from the virtual object tracker module.

17. The method of claim 16, comprising:
    detecting movement of the virtual object to the second location based on information received from the object velocity and directional module; and
    changing a rendering of the virtual object from a first rendering associated with the first location to a second rendering associated with the second location.

18. An article of manufacture comprising a non-transitory computer-readable storage medium containing a plurality of instructions that when executed enable a processing circuit to:
    receive first input data from a touch screen sensor based on one or more detected touch inputs at a first location of a virtual object presented on a display;
    receive second input data from an ultrasonic sensor based on detected non-touch motion associated with the virtual object; and
    track the detected non-touch motion from the first location to a second location in a direction away from the display based on the second input data.

19. The article of claim 18, the one or more touch inputs comprising a touch gesture to select the virtual object and the non-touch motion comprising a directional motion to indicate movement of the virtual object on a plane different than a display plane.

20. The article of claim 18, comprising instructions that when executed enable the processing circuit to determine a gesture associated with the non-touch motion based on the second input data.

21. The article of claim 20, comprising instructions that when executed enable the processing circuit to track the non-touch motion based on information received from the object and gesture recognition module and to determine the second location based on the information.

22. The article of claim 21, comprising instructions that when executed enable the processing circuit to determine that the virtual object is released at the second location based on the second input data and the gesture.

23. The article of claim 18, comprising instructions that when executed enable the processing circuit to determine one or more of a trajectory and a velocity of the virtual object based on information received from the virtual object tracker module.

24. The article of claim 23, comprising instructions that when executed enable the processing circuit to:
  detect movement of the virtual object to the second location based on information received from the object velocity and directional module; and
  change a rendering of the virtual object from a first rendering associated with the first location to a second rendering associated with the second location.

* * * * *